(12) United States Patent
Horio et al.

(10) Patent No.: US 8,630,206 B2
(45) Date of Patent: Jan. 14, 2014

(54) COMMUNICATION SYSTEM AND SERVER

(75) Inventors: Kenichi Horio, Kawasaki (JP); Kazuki Matsui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 683 days.

(21) Appl. No.: 12/843,432

(22) Filed: Jul. 26, 2010

(65) Prior Publication Data

US 2011/0026433 A1   Feb. 3, 2011

(30) Foreign Application Priority Data

Jul. 28, 2009   (JP) ................................ 2009-175764

(51) Int. Cl.
*H04L 12/28* (2006.01)
(52) U.S. Cl.
USPC ......................................................... 370/254
(58) Field of Classification Search
USPC .................. 370/254; 455/518, 519
See application file for complete search history.

(56) References Cited

U.S. PATENT DOCUMENTS

| 8,224,366 B2* | 7/2012 | Reich et al. ................. 455/517 |
| 2004/0072586 A1* | 4/2004 | Dorenbosch ................ 455/507 |
| 2007/0214217 A1* | 9/2007 | Ueno et al. .................. 709/204 |
| 2010/0216487 A1* | 8/2010 | Yamaguchi ................ 455/456.1 |

FOREIGN PATENT DOCUMENTS

| WO | WO 2006/051624 A1 * | 5/2006 | ............ H04Q 7/38 |
| WO | WO 2007/097210 A1 * | 8/2007 | ............ H04M 11/00 |
| WO | 2008/126259 | 10/2008 | |

OTHER PUBLICATIONS

Open Mobile Alliance "Push to Talk over Cellular Requirements", Approved Version 1.0, pp. 1-75, Jun. 9, 2006 (in English).

\* cited by examiner

*Primary Examiner* — Robert Wilson
*Assistant Examiner* — Kevin Lee
(74) *Attorney, Agent, or Firm* — Staas & Halsey LLP

(57) ABSTRACT

A server judges whether a withdrawn terminal is included in a first communication group, wherein the withdrawn terminal is a terminal which is provided with sending permission in a second communication group and not provided with sending permission in the first communication group. The server sends a notice of withdrawal of the withdrawn terminal from the second communication group, when judged that the withdrawn terminal is included in the first communication group.

9 Claims, 24 Drawing Sheets

FIG. 4

| SESSION ID | MEMBER | PARTICIPATED MEMBER | RIGHT TO TALK | PRIORITY | ELAPSED TIME [sec] |
|---|---|---|---|---|---|
| 1 | user01,user02,user03, user04 | user01,user03,user04 | user01 | LOW | 75 |
| 2 | user01,user02,user05, user06,user10 | user02,user06 | | HIGH | 5 |
| 3 | user01,user05,user06, user07,user08,user09 | user05,user07,user08, user09 | user05 | LOW | 25 |
| 4 | user10,user11 | user10,user11 | user10 | LOW | 55 |

FIG. 5

| NO. | FILE NAME | AUDIO FORMAT | CONTENTS |
|---|---|---|---|
| 1 | speaker_exit_ulaw.wav | G.711 µ-law | TALKER EXIT TEMPORALLY. |
| 2 | speaker_exit_gsm.wav | GSM 6.10 | TALKER EXIT TEMPORALLY. |
| 3 | system_end_ulaw.wav | G.711 µ-law | SYSTEM STOPS FOR MAINTENANCE. |
| 4 | system_end_gsm.wav | GSM 6.10 | SYSTEM STOPS FOR MAINTENANCE. |

FIG. 6

| SESSION ID | TALKING USER | PARTICIPATING USER | ADDRESS | AUDIO PORT NO. | VIDEO PORT NO. |
|---|---|---|---|---|---|
| 1 | user01 | user01 | xxx.xxx.xxx.xxx | 5000 | 6000 |
| | | user03 | yyy.yyy.yyy.yyy | 5000 | 6000 |
| | | user04 | zzz.zzz.zzz.zzz | 5002 | 6002 |
| 2 | | user02 | ooo.ooo.ooo.ooo | 5002 | 6002 |
| | | user06 | ppp.ppp.ppp.ppp | 5002 | 6002 |

FIG. 9

| WAITING TERMINAL | PARTICIPATING SESSION ID | FORCED PARTICIPATING DESTINATION SESSION ID | WAITING-START TIME[ms] |
|---|---|---|---|
| user01 | 1 | 2 | 122301 |
| user05 | 3 | 2 | 122301 |
| user20 | 5 | 4 | 123891 |

FIG. 10

| USER ID | BUSY JUDGING FLAG | SILENCE STARTING TIME[ms] | SILENCE FINAL CONFIRMING TIME[ms] | SILENCE TIME[ms] |
|---|---|---|---|---|
| user01 | ON | 120399 | 120899 | 500 |
| user02 | OFF | — | — | — |
| user03 | OFF | — | — | — |
| user04 | OFF | — | — | — |

FIG. 15

| USER ID | BUSY DETERMINATION FLAG | SILENCE START TIME [ms] | TIME OF SILENCE FINAL CONFIRMATION [ms] | SILENCE TIME [ms] | STORING-START FLAG | STORING-START TIME [ms] | STORED DATA | STORED DATA LENGTH [B] | STORED DATA FORMAT |
|---|---|---|---|---|---|---|---|---|---|
| user01 | ON | 120399 | 120899 | 500 | OFF | — | — | — | — |
| user02 | OFF | — | — | — | OFF | — | — | — | — |
| user40 | OFF | — | — | — | ON | 232098 | 0xF8199a | 2400 | μ-law |
| user41 | ON | 233300 | 234000 | 700 | ON | 233100 | 0xF8599a | 825 | GSM |

FIG. 19

| SESSION ID | SENDING DESTINATION LIST | TALKING NO. | TALKING USER | DURING-RECORDING FLAG | RECORDING DATA | RECORDING DATA LENGTH [B] | RECORDING DATA FORMAT | SENT LIST |
|---|---|---|---|---|---|---|---|---|
| 2 | user01,user05 user10 | 1 | user02 | OFF | 0xF60000 | 16 | μ-law | user01,user05 |
| | | 2 | user06 | OFF | 0xF76000 | 24 | μ-law | user01 |
| | | 3 | user02 | ON | 0xF8199a | 2.4 | μ-law | |
| 4 | user20 | 1 | user21 | OFF | 0xF8599a | 825 | GSM | |

COMMUNICATION SYSTEM AND SERVER

CROSS-REFERENCE TO RELATED APPLICATIONS

This application is based upon and claims the benefit of priority of the prior Japanese Patent Application No. 2009-175764, filed on Jul. 28, 2009, the entire contents of which are incorporated herein by reference.

FIELD

The embodiments discussed herein is directed to a communication system in which a plurality of communication terminals, such as cell phones, transmits and receives data, such as sounds and videos, through a server.

BACKGROUND

A Push-to-talk over Cellular (PoC) system using communication terminals, such as cell phones, has been put into practical use. In the PoC system, one user having a communication terminal can send a voice to the communication terminals of the other users at once. In other words, the PoC system can perform one-to-many communication and thus the PoC system has been received considerable attention as a simple communication tool in a group of a plurality of users. In this system, the user has to push a talk button on the communication terminal to acquire the right to talk, followed by talking. Voice that correspond to the talking during a period from the push of the transmission button to the abandonment (release) of the right to talk are simultaneously sent to other communication terminals, so that other users can hear the voice.

In the PoC system, however, when one user is talking, other users are not allowed to acquire the right to talk. Thus, two or more users cannot perform voice transmission at the same time.

Furthermore, the PoC system includes a server for managing the right to talk and sending/receiving audio data. In response to the request of the right to talk from a communication terminal, the server provides the communication terminal with the right to talk to permit this terminal to talk. Subsequently, the server receives audio data sent from the talking-permitted communication terminal and then broadcasts the audio data to other communication terminals. In this case, the server is set to broadcast audio data to communication terminals included in a previously registered communication group. The server manages such a communication group.

SUMMARY

According to an aspect of the invention, a server including a judging unit and a sending unit. The judging unit judges whether a withdrawn terminal is included in a first communication group, wherein the withdrawn terminal is a terminal which is provided with sending permission in a second communication group and not provided with sending permission in the first communication group. The sending unit sends a notice of withdrawal of the withdrawn terminal from the second communication group to one or more terminals included in the second communication group, when the judging unit judges that the withdrawn terminal is included in the first communication group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of terminal management data stored in the communication control server;

FIG. 5 illustrates an example of the system message storing data stored in the communication control server;

FIG. 6 illustrates an example of the distribution destination data stored in the communication media server;

FIG. 9 illustrates an example of the management data for waiting a forced change stored in a forced change management unit of a communication control server according to a second embodiment;

FIG. 10 illustrates an example of busy management data stored in the communication media server of the second embodiment;

FIG. 15 illustrates an example of busy management data stored in the busy judging unit of a communication media server according to the fourth embodiment;

FIG. 19 illustrates an example of a media-recording data stored in a media-recording unit of a communication media server according to the fifth embodiment.

DETAILED DESCRIPTION OF EMBODIMENT(S)

(First Embodiment)

Figure 1:
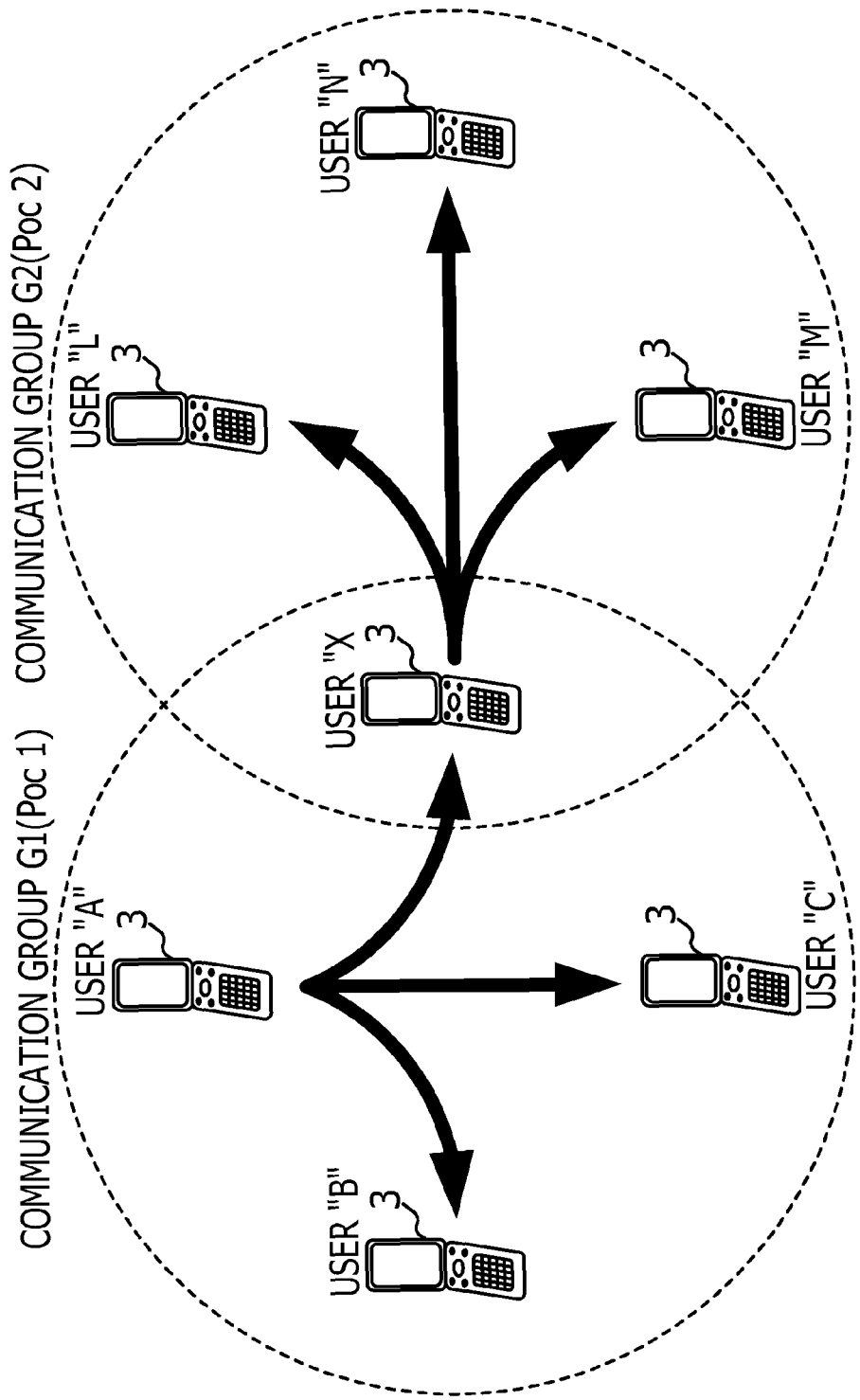
FIG. 1 illustrates two communication groups in a communication system according to a first embodiment.

FIG. 1 is a schematic diagram that illustrates one-to-many communication in a communication group using a communication system according to a first embodiment. The communication system of the present embodiment is a system having a PoC-based communication function. The PoC system allows a plurality of communication terminals 3 participating in the same communication group to perform one-to-many communication among them. In an example shown in FIG. 1, a communication group G1 (PoC 1) includes three communication terminals 3 belonging to different members, user "a", user "b", and user "c", respectively, and a communication group G2 (PoC 2) includes three communication terminals 3 belonging to different members, user "l", user "m", and user "n", respectively. In addition, a communication terminal 3 belonging to user "x" participates in both communication groups G1 and G2.

In the communication system of the present embodiment as described above, one communication terminal 3 is allowed to participate in two or more communication groups and perform one-to-many communication using the PoC system in these communication groups.

The PoC system permits only one user to perform one-to-many communication in one communication group. In other words, there is only one right to talk in one communication group. For example, when the user "a" talks after acquiring the right to talk, other users "b", "c", and "x" participated in the communication group G1 can simultaneously listen to the talking of the user "a". Other users cannot talk when the user "a" is talking. When the user "a" finishes talking and releases the right to talk, any of other users in the communication group G1 acquires the right to talk and is now allowed to talk. Such procedures are also applied to the communication group G2. Here, it is noted that each communication group is provided with one right to talk. Thus, even if the user "a" is talking in the communication group G1, the user "x", who participates in the communication group G2 that is different from the communication group G1 where the user "a" participates in, can talk in the communication group G2 after acquiring the right to talk therein.

Here, the term "participate" in the group means the user is in the state of being allowed to receive the contents of the talking in the group. If the user participates in two or more groups, the user is allowed to receive and reproduce the talking from these groups. Here, the term "participate" in the group may include not only the state of being allowed to receive the contents of talking in the group but also the state of being allowed to talk by pushing the right to talk.

In the conventional communication system based on the PoC technology which has been standardized by Open Mobile Alliance (OMA), if the user "a" talks in the communication group G1 while the user "x" is talking in the communication group G2, the user "x" continues talking in the communication group G2 and the talking of the communication group G1 is excluded (the talking of the user "a" cannot be heard).

In the communication system of the present embodiment in such a situation, on the other hand, the system forcibly acquires the right to talk in the communication group G2 and notifies the users (users "l", "m", "n", and/or "x") in the group G2 of withdrawal of the user "x" (user X's terminal (withdrawn terminal)) from the communication group G2, followed by forcibly bringing the user "x" into the communication group G1 and sending the talking of the user "a" to the user "x". Therefore, the user "x" can stop talking in the communication group G2 and then other users ("l", "m", and "n") can recognize that the user "x" is invited from any of other communication groups and temporarily leaves the communication group G2. In addition, the user "x" can listen to the talking of the user "a" in the communication group G1.

Figure 2:
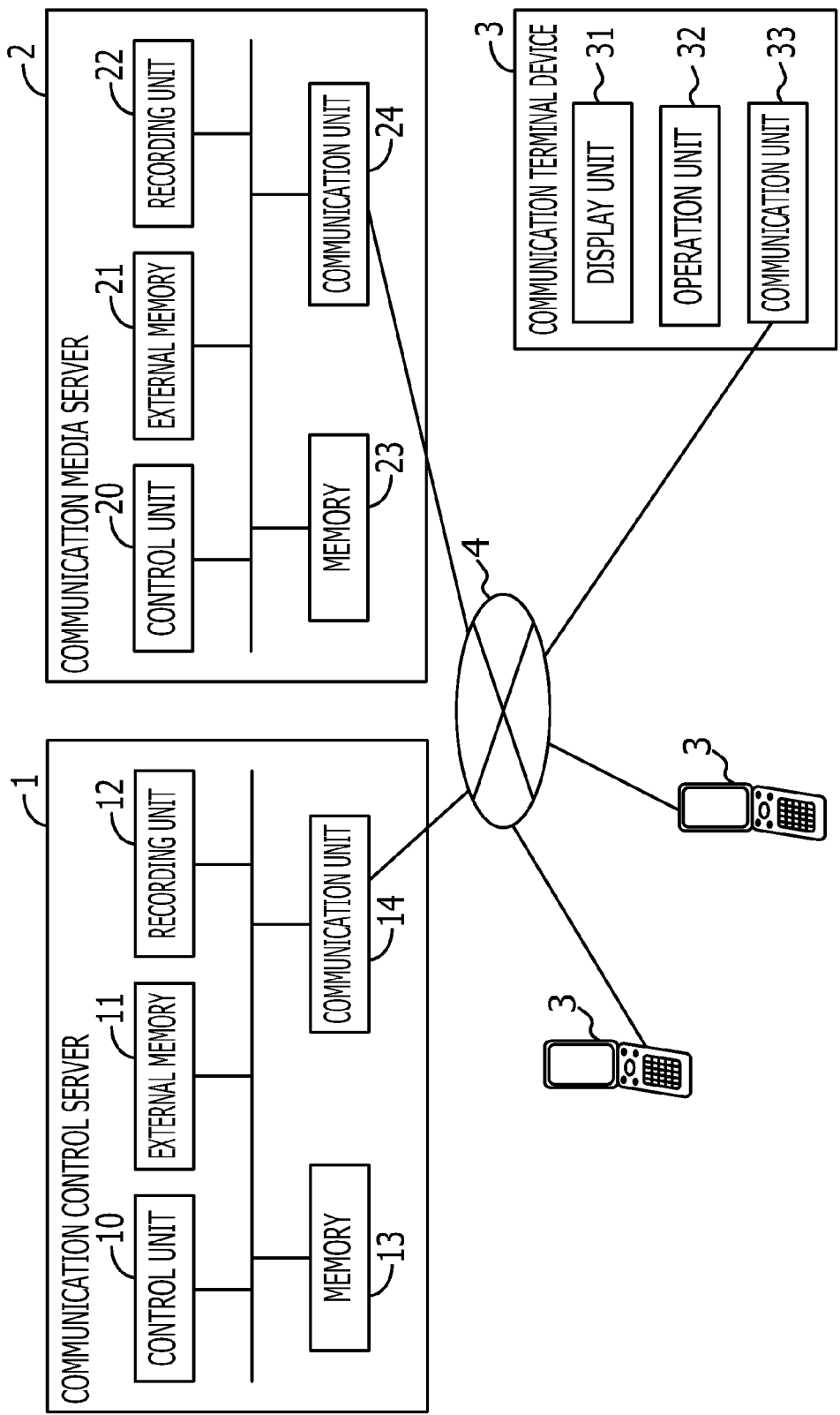
FIG. 2 illustrates a hardware configuration of the communication system according to the first embodiment.

In the communication system of the first embodiment, a communication control server 1 and a communication media server 2, which are responsible for management, control, and so on of the PoC system, perform the control of switching the participating groups, the process of providing/removing the right to talk, the process of sending/receiving media data, and so on (see FIG. 2).

FIG. 2 is a block diagram illustrating an example of the hardware configuration of the communication system according to the first embodiment. The communication control server 1 includes: a control unit 10, such as a central processing unit (CPU), for controlling the server 1 entirely; an external memory 11, such as a CD-ROM drive, for reading various kinds of information from a recording medium (not shown), such as CD-ROM, on which various kinds of information, such as a computer program and data are recorded; a recording unit 12, such as a hard disk, for recording various kinds of information read from the external memory 11; and a memory, such as RAM, for temporarily storing the information. The computer program recorded on the recording unit 12 is stored in the memory 13 and then executed by the control unit 10 to operate the communication control server 1 as a server (first server) disclosed herein. Furthermore, the communication control server 1 includes a communication unit which connects to a communication network 4 to perform packet communication. Furthermore, in addition to the computer program, various programs including an operating system (OS) are recorded on the recording unit 12.

As with the communication control server 1, the communication media server 2 includes a control unit 20, an external memory 21, a recording unit 22, a memory 23, and a communication network 14. That is, a computer program is stored in the memory 23 and then executed by the control unit 20 to operate the communication control server 2 as a server (second server) disclosed herein.

The communication terminal 3 is a terminal device having a communication function, such as a cell phone or a PDA (Personal Digital Assistant). The communication terminal 2 includes: a display unit 31, such as a liquid crystal display or an organic EL display; an operation unit 32 with operation buttons, a touch panel, or the like for receiving the user's operation; and a communication unit for sending/receiving data to/from the communication control server 1 through a communication network 4.

If a user having a communication device 3 participates in a communication group to communicate with other users, communication groups where the user belongs are displayed on the display unit 31 of the communication terminal 3 and any communication group where the user intends to participate in communication is then selected using the operation unit 32. The information about the communication group selected by the communication terminal 3 is informed to the communication control server 1 through the communication network 4. Subsequently, a fact that the user is participating is then registered as terminal management data (see FIG. 4).

Figure 3:
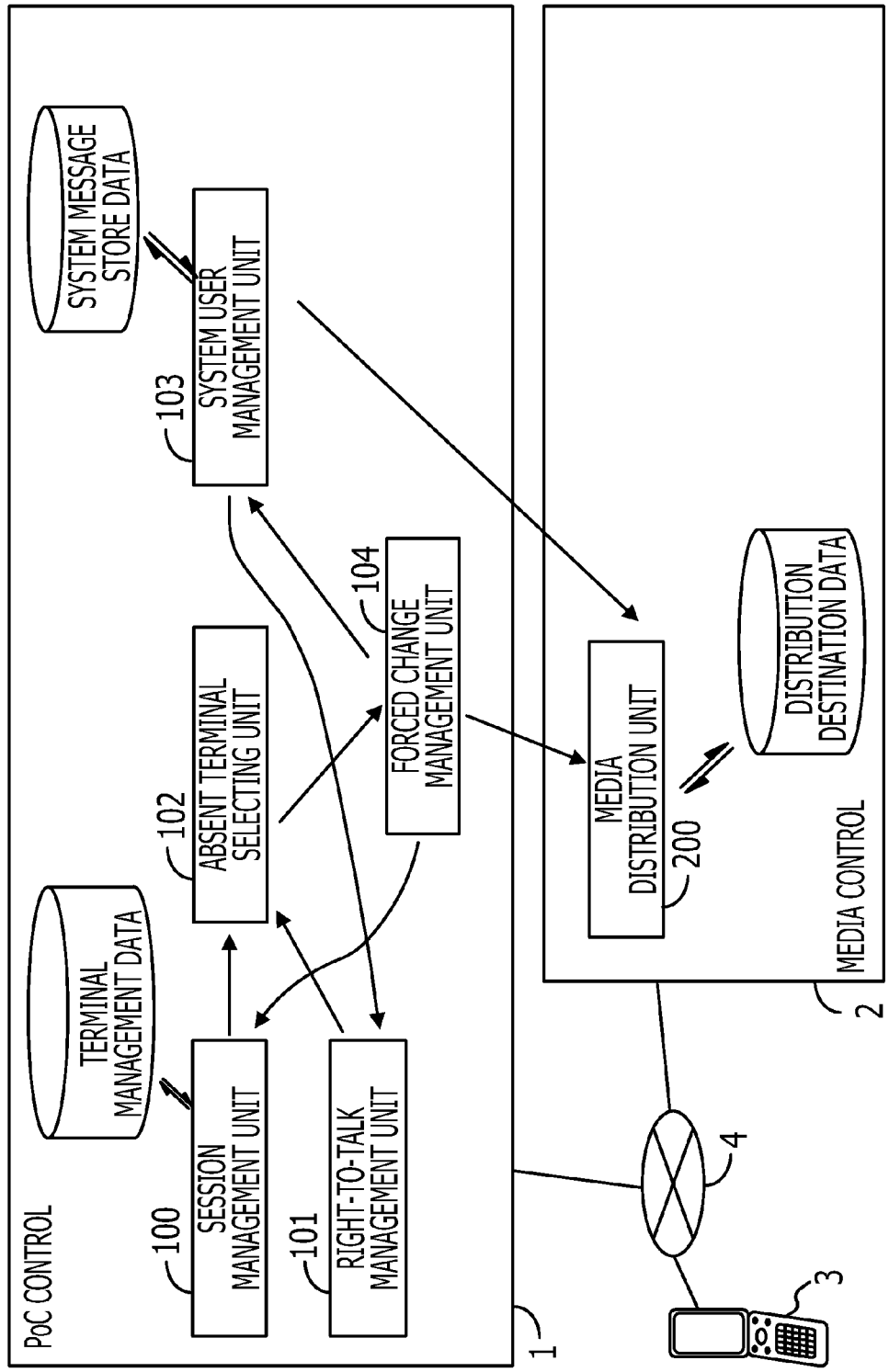
FIG. 3 is a functional block diagram that illustrates a software configuration of the communication system according to the first embodiment.

FIG. 3 is a functional block diagram that illustrates an exemplary software configuration of the communication system according to the first embodiment. The communication control server 1 allows the control unit 10 to execute a computer program to realize various functions as various program modules in a session management unit 100, a right-to-talk management unit 101, an absent terminal selecting unit 102, a system user management unit 103, a forced change management unit 104, and so on.

The communication media server 2 allows the control unit 20 to execute the computer program to realize various functions as various program modules in a media distribution unit 200 and so on.

The session management unit 100 manages the information about communication groups and then stores various kinds of the information including the identification data (ID) of users who can participate in each of the communication groups, the ID of the currently participating users, the ID of the currently talking user, the priority of each communication group, the elapsed time after organizing the communication group, and so on. Furthermore, the session management unit 100 communicates with the media distribution unit 200 to set up the address, port, and so on of a media distribution source and a media distribution destination.

FIG. 4 is a diagram illustrating an example of terminal management data stored in the communication control server 1. The example shown in FIG. 4 represents a state in which a session having the session ID "1", which is the identifier of the group, can allow four members, user 01 to user 04, to participate in this session and three members except for the user 02 are currently participating in the session.

Furthermore, FIG. 4 shows that the user 01 acquires the right to talk now, the priority of the session is low, and 75 seconds are elapsed from starting of the session. Other sessions are also behaved in this manner. There is no speaker in the session with a session ID of "2".

If the right-to-talk management unit 101 shown in FIG. 3 has received a request of acquiring the right to talk or a request of releasing the right to talk, the session management unit 100 is referenced to determine whether the right to talk can be provided or deprived. Then, a response is made to the communication terminal 3 from which the request has been made.

The absent terminal selecting unit 102 selects a communication terminal 3 that may be unable to listen talking with reference to the session management unit 100 at the time of receiving requests of acquiring the right to talk from the communication terminals 3. The absent terminal selecting unit 102 selects the communication terminal 3, which is a presently absent member of the session (communication group) to which the right to talk has been requested, because it may be unable to hear the talking.

The system user management unit 103 makes a system user participate in the specified session in response to an instruction from the forced change management unit 104. Thus, the system user is allowed to forcibly acquire the right to talk and sends a system message (voice message) to a plurality of communication terminals 3. The data of the system message is previously registered into the communications control server 1.

FIG. 5 is an example of the system message data stored in the communication control server 1. The data on the first and second rows of the table shown in FIG. 5 are audio data representing that the speaker has exited in process of talking. The first data is being stored using a file name of "speaker_exit_ulaw.wav" and the audio data is formatted using G. 771 µ-law. The second data is stored in GSM 6.10 format which is different from the first one. Therefore, it is possible to change the data to be transmitted from one to another depending on the data format supported by the communication terminal 3 of the sending destination.

Likewise, the third and fourth data are messages to be represented when the system stops.

Among the list of absent terminals received from the absent terminal selecting unit 102, the forced change management unit 104 shown in FIG. 3 selects a communication terminal 3 that does not participate in a session (PoC1) where the right to talk is requested but participates in another session (PoC2) and besides, obtains the right to talk in the PoC2. Furthermore, the forced change management unit 104 transmits an instruction to the session management to stop the talking of the communication terminal (withdrawn terminal) 3 which is currently talking in this PoC2. Then, the forced change management 10 sends an instruction to the system user management unit 103 to make the system user management unit 103 send a notice of withdrawal of the speaker to the communication terminal 3 which is currently participating in the PoC2. Furthermore, the forced change management unit 104 can forcibly change the participating session of the communication terminal (withdrawn terminal) 3, which has performed talking, from the PoC 2 to PoC 1 and then informs the communication terminal 3 in the forcibly changed session of a change in session in which the communication terminal 3 is currently participating. According to an aspect of an embodiment, a terminal withdrawal notification can be to a withdrawn terminal 3 and/or one or more other communication terminal(s) 3 of a communication group from which a terminal was withdrawn.

According to an instruction from the session management unit 100, the media distribution unit 200 of the communication media server 2 receives the information about the distribution source and distribution destination of the media (addresses and port numbers) and then stores the information as distribution destination data. In addition, according to the data, the media distribution unit 200 performs distribution (send and reception) of media data.

FIG. 6 shows an example of distribution destination data stored in the communication media server 2. In the example shown in FIG. 6, user 01, user 03, and user 04 participate in session "1" and the user 01 is currently acquiring the right to talk. In this case, the media distribution unit 200 receives audio data from the port No. 5000 at the IP address xxx.xxx.xxx.xxx of the user 01, and then distributes the data to the port No. 5000 at the IP address yyy.yyy.yyy.yyy of the user 03 and the port No. 5002 at the IP address zzz.zzz.zzz.zzz of the user 04. If video data is distributed simultaneously with the distribution of the audio data, the video data can be distributed with reference to the stored addresses and port numbers.

Figure 7A:
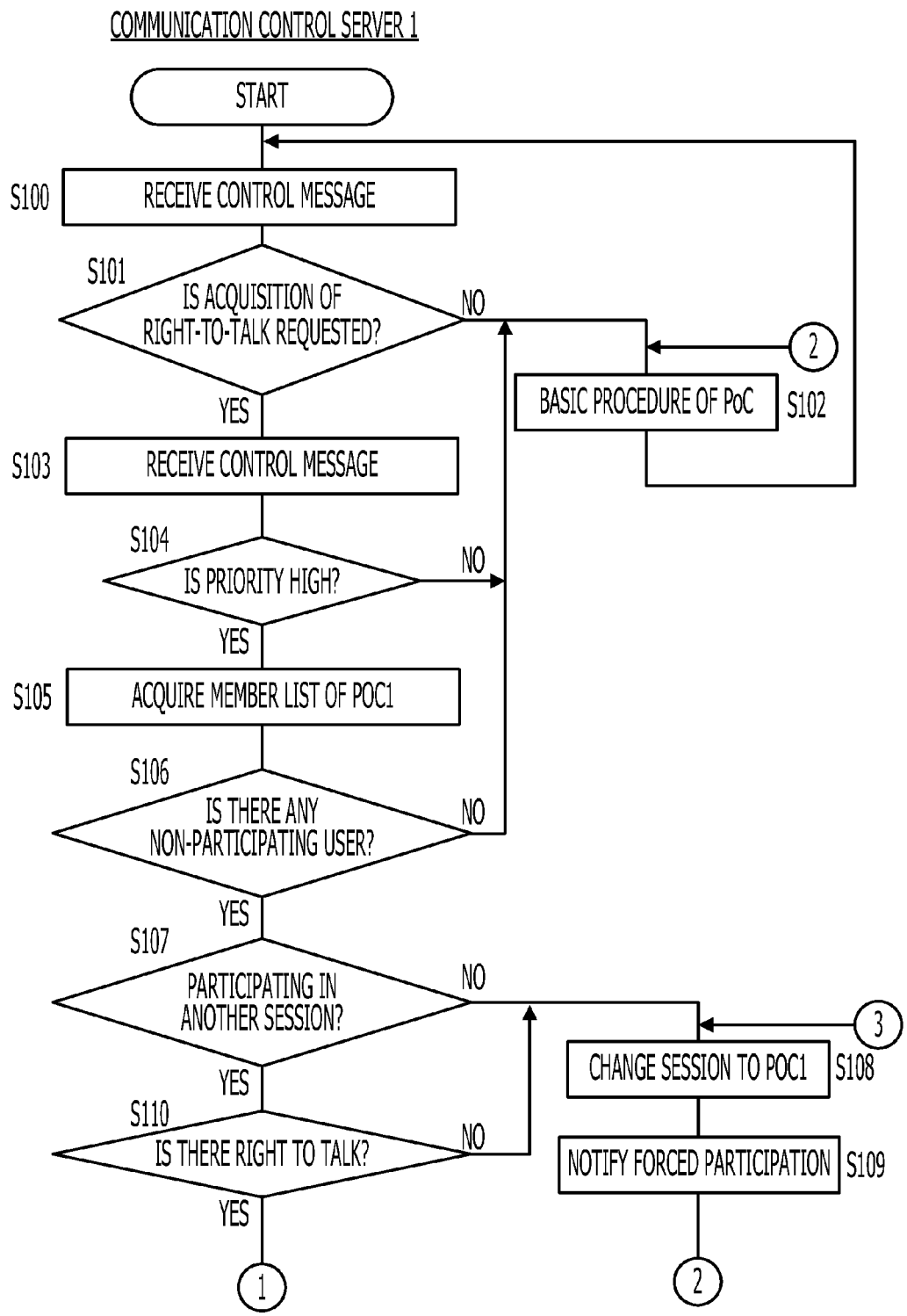
FIG. 7A and FIG. 7B illustrate a flowchart that represents processes carried out in the communication control server and the communication media server according to the first embodiment.

FIG. 7A is a flowchart that illustrates the process of determining whether the communication terminal 3 (speaker) that requires a forcible change in session when the communication control server 1 receives a request of acquiring the right to talk is present; and, if it exists, informing another user participating in the session where the speaker is talking of a notice of withdrawal of the speaker.

The communication control server 1 always monitors whether a control message has been received from the communication terminal 3. If the communication control server 1 has received a control message (S100), then the communication control server 1 judges whether the message is a request of acquiring the right to talk (S101). If it is not a request of acquiring the right to talk (S101: NO), the communication control server 1 performs the basic procedure of PoC (S102) and then returns the process to S100. Here, the basic procedure of PoC includes the procedure of managing the users participating in each session, the procedure of imparting the right to talk, the procedure of counting a time elapsed from the start of the session, and so on. If the control message received in S100 is a request message for acquiring the right to talk (S101: YES), then the absent terminal selecting unit 102 requests the session management unit 100 to dominantly acquire the priority of the session (PoC1) where the right to talk is requested (S103).

The session foreperson may assign the priority of the session (PoC1) when starting the session. Alternatively, the priority of the session may be automatically assigned with reference to information, such as the ID or affiliation information, or the like of the session foreperson. Otherwise, the priority of the session may be automatically assigned with reference to information, such as the ID or affiliation information, or the like of the speaker. Alternatively, any of various other methods, such as one previously determining using a setup file or the like, may be employed.

The absent terminal selecting unit 102 judges whether the acquired priority is high (S104). If the acquired priority is high (S104: YES), then the absent terminal selecting unit 102 acquires the list of members who can participate in the group communication of PoC1 (S105). On the other hand, if S104 determines that the priority is low (S104: NO), then the communication control server 1 performs the basic procedure of PoC (S102), followed by returning the process to S100.

When the absent terminal selecting unit 102 acquires the list of members who are participating and/or non-participating in the group communication of PoC1 in S105, then the forced change management unit 104 judges whether any non-participating user in PoC1 is found in the list (S106). If there is no non-participating user (S106: NO), then the communication control server 1 performs the basic procedure of PoC (S102), followed by returning the process to S100.

If there is a non-participating user (S106: YES), then the forced change management unit 104 checks each non-participating user (user x) and judges whether such a user participates in another session (i.e., any of sessions other than PoC1) (S107). If the user x does not participate in any of sessions other than PoC1, or does not participate in any session (S107: NO), then the forced change management unit 104 changes the session in which the user x has already participated to PoC1 (S108).

The phrase "change the session in which the user x has already participated to PoC" specifically means that both the participated member field of the terminal management data shown in FIG. 4 and the participating user field of the distribution destination data shown in FIG. 6 are updated and the user X is then transferred to an appropriate session. Therefore, the user x will receive talking performed in PoC1 from now on.

Here, in this embodiment, the communication terminal 3 is in a state of capable of always communicating with both the communication control server 1 and the communication media server 2 (i.e., in a logon state) even if the communication terminal 3 does not participate in any session. However, for example, it is possible that the communication terminal 3 cannot communicate with the communication control server 1 and the communication media server 2 due to interrupted wireless-communication waves or the like or is intentionally in a logoff state even though it is able to communicate with these servers 1 and 2, and at this time, a change in participated session or the like is not performed. operations subsequent to S108, where the participated session of the communication terminal 3 is changed when the communication terminal 3 is brought into a logon state, may be performed.

Furthermore, the forced change management unit 104 transmits a forced participation notice to the communication terminal 3 of the user x to inform that the session in which the user x participates is changed to PoC1 (S109). After notifying the forced participation notice, the communication control server 1 performs the basic procedure of PoC and then returns the process to S100.

If S107 determines that the user x is participating in another session (S107: YES), then it is determined whether the user x acquires the right to talk in this session (S110). If the user x does not acquire (has not acquired) the right to talk (S110: NO), then the process subsequent to S108, where the participated session of the communication terminal 3 is changed to PoC1, is performed.

If the right to talk is (has been) acquired by user x (S110: YES), then the forced change management unit 104 instructs the system user management unit 103 to make a virtual user (system user) participate in the session (PoC2) where the user x currently participates therein and acquires the right to talk to transmit a system message to the session (PoC2) (S111 in FIG. 7B). Furthermore, the system user management unit 103 deprives the user x of the right to talk in the session in which the user x participates and forcibly makes the system user obtain the right to talk (S112).

The forced acquisition of the right to talk is realized by updating the right to talk field of the terminal management data shown in FIG. 4 and the talking user field of the distribution destination data shown in FIG. 6.

Subsequently, the system user management unit 103 acquires the file name of the system message specified by the forced change management unit 104 from the file name field of the system message store data shown in FIG. 5. Subsequently, the corresponding media data is read into the memory. The system user management unit 103 determines in which any unsent data is present in the session where the system user participates (S113). If the unsent data is present (S113: YES), then system user management unit 103 directs the media distribution unit 200 of the communication media server 2 to send part or whole of the unsent media data to the session in which the system user participates (S114). Subsequently, the process returns to S113 again and then repeats the procedure of checking whether the unsent data is present.

Here, the amount of data to be sent and the time interval of the transmission in S114 may be determined using parameters (e.g., an audio frame time, voice codec, or the like for audio data) determined when the data-receiving terminal starts to communicate with the communication media server 2. For example, if the communication terminal 3 of the user "a" decides to receive the data with an audio codec of G.711 si-law at an audio frame time of 20 msec, then the communication media server 2 sends 160 bytes of data to the communication terminal 3 of the user "a" at a time interval of 20 msec. The present embodiment has been described, provided that the media parameters of the respective terminals that participate in one section are common. Specifically, if the communication terminal 3 of the user "a" has an audio codec of G.711 si-law at an audio frame time of 20 msec, then the communication terminal 3 of each of the other participating users b, c, and so on has an audio codec of G.711 si-law at an audio frame time of 20 msec. Alternatively, the users may have their own parameters which are different from one another. In this case, however, it is necessary to manage the send data and the amount of the sent data not for the sending destination session but for each sending destination user in S113 and S112.

The media distribution unit 200 of the communication server 2 which is requested to send the system message data in S114 refers to the participating user field shown in FIG. 6 and then transmits the audio data of the system message to the address/port of the participating user (PoC2 member) (S115).

If there is no unsent data in S113 (S113: NO), or the whole system data have been transmitted, then the forced change management unit 104 performs the operations subsequent to S108 shown in FIG. 7A where the user-participated session is changed to PoC1.

As described above, both the communication control server 1 and the communication media server 2 participate in different sessions when talking is performed in an important (high priority) session. Besides, when the communication terminal 3 in which talking is being performed is present, another user who listens to the talking of the communication terminal 3 can be informed of a notice of withdrawal of the speaker. Therefore, confusion of conversation can be prevented and the communication terminal 3 which is currently talking can forcibly listen to the important talking. Although the embodiment in which the talking is performed in the high-priority session has been described, any other user(s) of any other session(s) may listen to the talking by any of users who performed talking in another session without consideration of priority. For example, the procedures in S103 and S104 may be omitted and the procedure in 105 may be carried out.

Although the embodiment has been described so that the communication terminal 3 which is currently talking will receive a system message informing the withdrawal of the communication terminal 3 itself, the communication terminal 3 which is currently talking may listen talking in an important session promptly without sending the system message. In this case, the procedures in S108 and S109 may be performed before the procedure in S111.

As described above, when a communication terminal which can participate in two or more communication group is talking, the system of the present embodiment does not miss a single word of talking in another group. In addition, the system of the present embodiment can inform other communication device users, who listen to the talking of the above communication terminal, of a notice of withdrawal of the speaker. Therefore, the user can be prevented from confusion.

(Second Embodiment)

In the communication system of the first embodiment, when talking is performed in a high-priority session, the communication terminal 3 which is talking in another session can be forcibly brought into the high-priority session immediately to listen to the talking in the high-priority session. In contrast, in a second embodiment, if talking is performed in a high-priority session, the monitoring of the contents of talking of the communication terminal 3, which is talking in another session, is started and the communication system enters the state of waiting for a forced change in session. Furthermore, the timing of becoming silent in the contents of the talking is detected as a break of the talking and a change in session can be performed using such timing.

Figure 8:
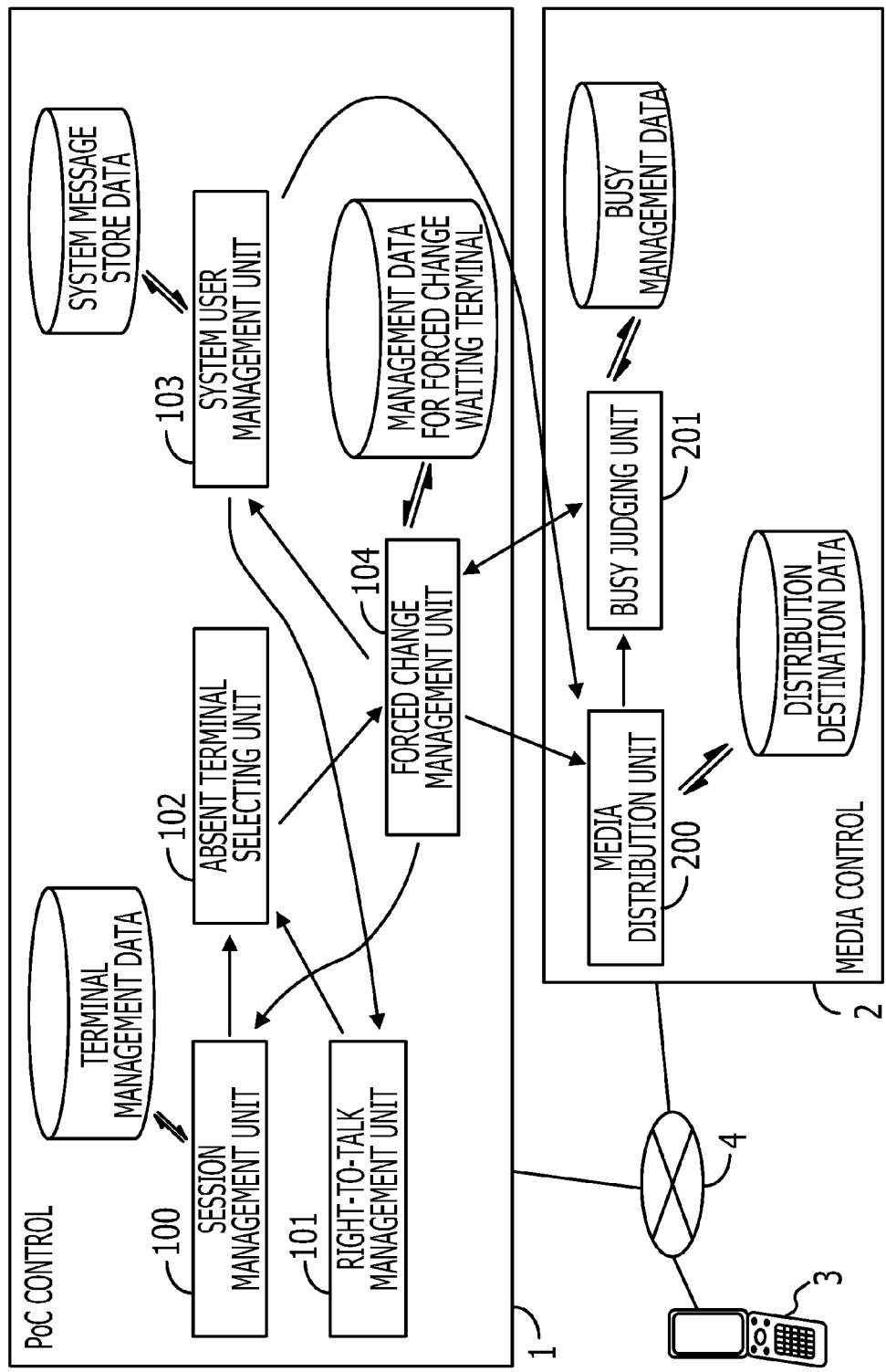
FIG. 8 illustrates a software configuration of a communication system according to a second embodiment.

FIG. 8 is a functional block diagram that illustrates an exemplary software configuration of a communication system according to a second embodiment. In a communication control server 1 of the communication system according to the second embodiment, like the one described in the first embodiment, a forced change management unit 104 manages a session change of a communication terminal 3 selected (identified) by an absent terminal selecting unit 102. In addition, a system user management unit 103 sends a system message. These procedures are the same as those performed by the communication control server 1 of the communication system according to the first embodiment, so that the detailed descriptions thereof will be omitted. However, the forced change management unit 104 holds the management data for determination of, for example, a session on which forcible change is made at the time of silence detection.

FIG. 9 is a diagram illustrating an example of management data for waiting a forced change, which is stored in a forced change management unit 104 in the communication control server 1 of the second embodiment. In the example shown in FIG. 9, the user 01 is currently participating in PoC1 and talking. However, it is shown that there is new talking in PoC2 and the user 01 is in wait for forced participation in PoC2. The same may be also applied to any of other users (user 05 and user 20).

The communication media server 2 of the communication system according to the second embodiment includes a media distribution unit 200 that manages the distribution destination of media in response to an instruction from a session management unit 100 or the like just as in the case with the first embodiment. The procedures performed in the media distribution unit 200 are the same as those performed in one of the first embodiment, so that the detailed description thereof will be omitted. The communication media server 2 in the communication system of the second embodiment further includes a busy judging unit 201. The busy judging unit 201 acquires the audio data of a speaker from the media distribution unit 200 and monitors the acquired audio data in response to an instruction from a forced change management unit 104 to observe whether a silent state is continued over a certain period of time. The busy judging unit 201 transmits a notice of silence detection to the forced change management unit 104 and then informs the communication control server 1 of a break of the talking.

FIG. 10 is an example of busy management data stored in the communication media server 2 of the second embodiment. In the example shown in FIG. 10, only the user 01 is subjected to busy determination. A silent state is detected from audio data received at a time of 120399 msec elapsed from the system startup. The silent state is continued to a time of 120899 msec, and thus a duration time thereof is 500 msec.

Figure 11:
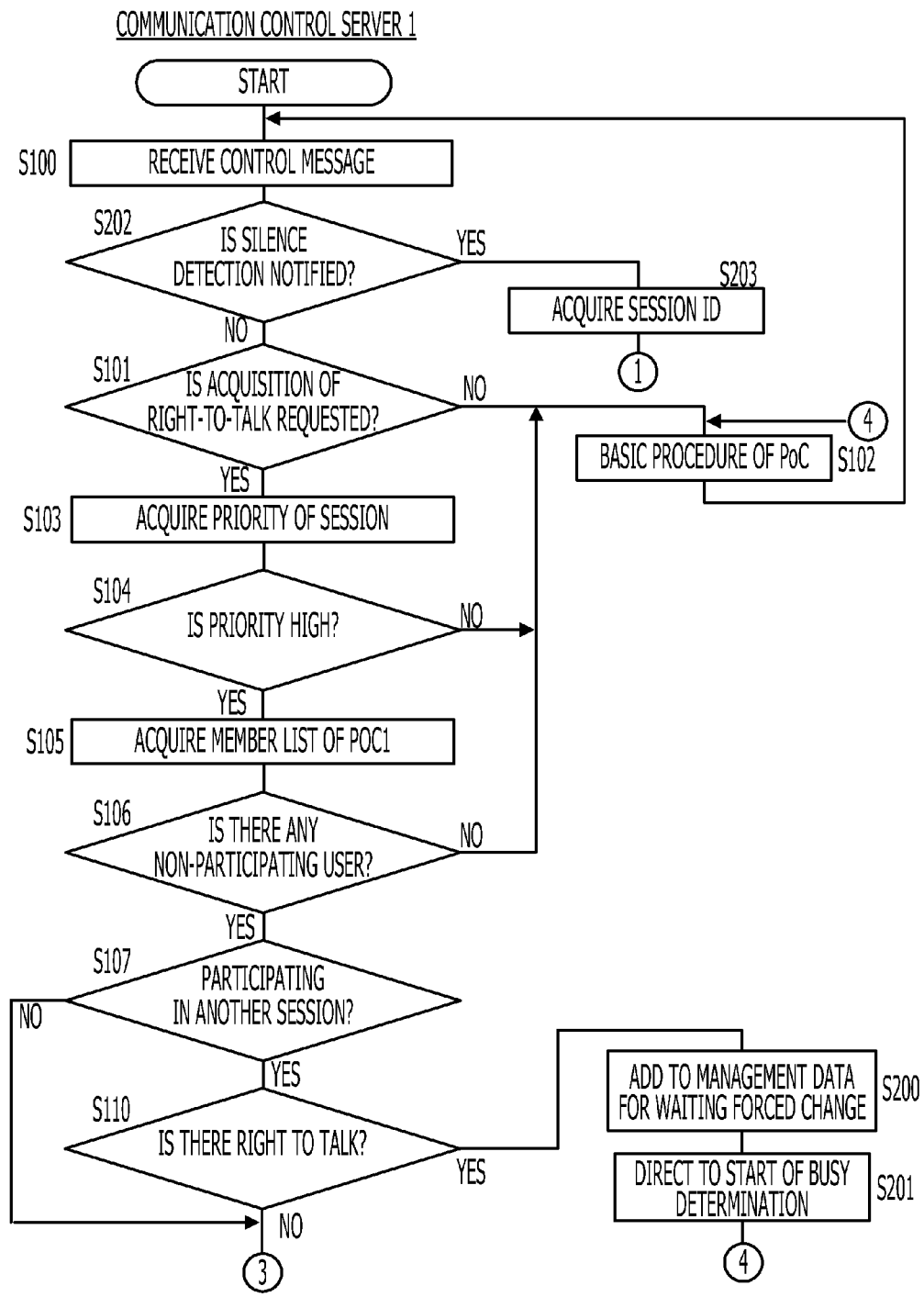
FIG. 11 illustrates a flowchart that represents a process carried out in the communication control server according to the second embodiment.

FIG. 11 is a flowchart of a process carried out by the communication control server 1 of the second embodiment. The procedures illustrated in FIG. 11 are different from those of the first embodiment in that the communication control server 1 does not forcibly change one session to another when receiving a request of the right to talk. In other words, FIG. 11 illustrates the procedures for asking the communication media server 2 to carry out the busy determination when receiving the request of the right to talk, followed by performing a forced change in session in response to the notice of silence detection from the communication media server 2. Here, the same procedures as those of the first embodiment will be represented by the same numbers as those in FIG. 7A and the detailed descriptions thereof will be omitted.

The communication control server 1 judges whether the user x (i.e., a user who belongs to PoC1 where the right to talk is requested and is currently participating in PoC2) acquires the right to talk in S110. If the user x acquires the right to talk (S110: YES), then the forced change management unit 104 adds the user x to the standby terminal field of the management data for waiting a forced change (S200). At this time, the forced change management unit 104 inputs the session information or the like of the current participating session of the forced participating destination. Subsequently, the forced change management unit 104 informs the busy judging unit 201 in the communication media server 2 of the start of determining whether the user X is busy (S201). After that, the communication control sever 1 performs the basic procedure of PoC (S102) and then returns the process to S100.

On the other hand, if it is determined that the user x does not acquire the right to talk in S110 (S110: NO), then the procedures of S108 and S109 shown in FIG. 7A are performed in a manner similar to the first embodiment. Then, the basic procedure of PoC is performed (S102) and the process is then returned to S100.

In addition, the communication control server 1 judges whether a control message received in S100 is a notice of silence detection (S202). If the received message is the notice of silence detection (S202: YES), then the communication control server 1 acquires the session information or the like of the current participating session of the forced participating destination with reference to the management data for waiting a forced change (S203).

Figure 7B:
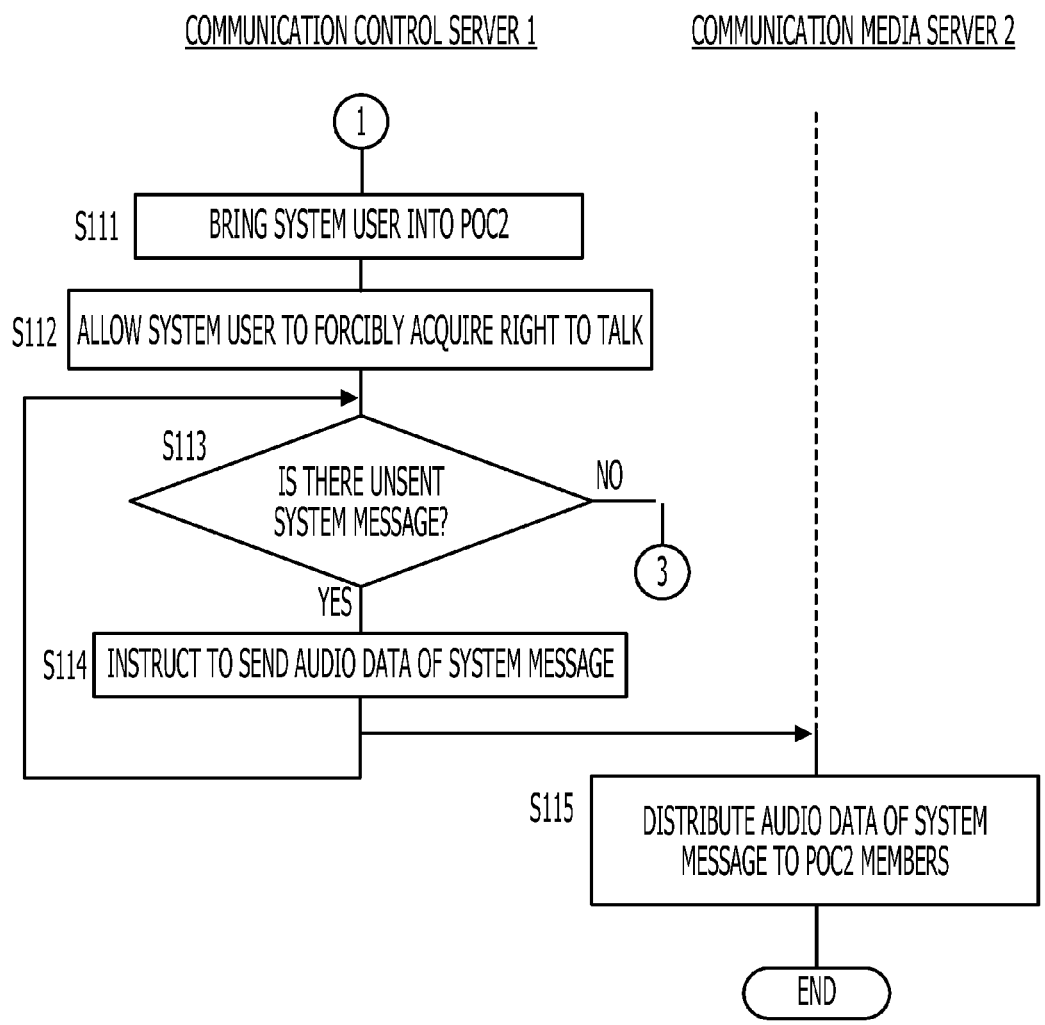

Subsequently, the communication control server 1 performs the operations subsequent to S111 shown in FIG. 7B in a manner similar to the first embodiment (i.e., the procedures for forcibly changing the participating session of the user x).

On the other hand, if it is determined that the received message is not a notice of silence detection (S202: NO), then the communication control server 1 performs operations subsequent to S101 in a manner similar to the first embodiment.

Figure 12:
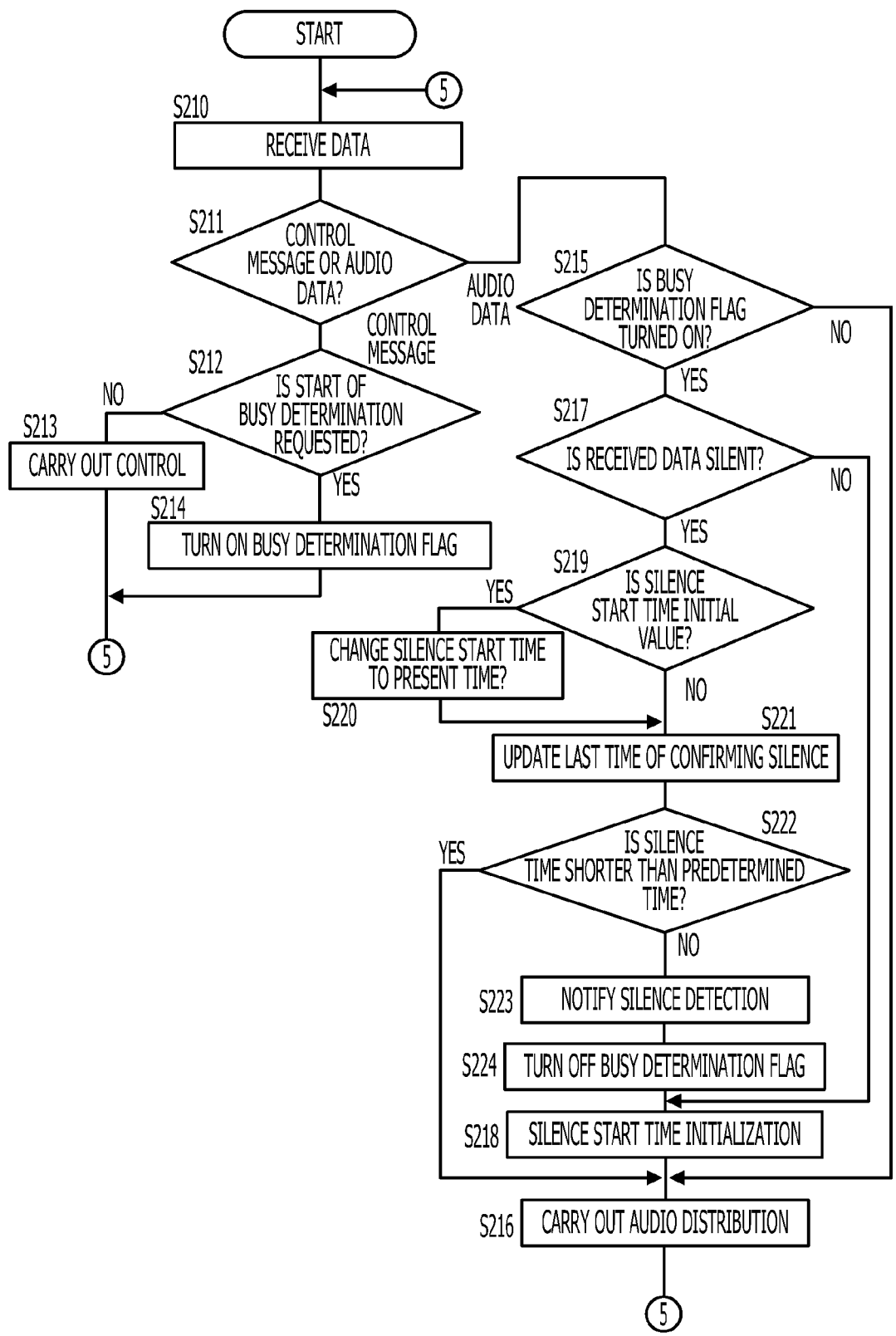
FIG. 12 illustrates a flowchart that represents a process carried out in the communication media server according to the second embodiment.

FIG. 12 illustrates a flowchart of a process carried out by the communication media server 2 of the second embodiment. Unlike the first embodiment, the second embodiment performs not only an audio distribution procedure and a control procedure for carrying out the audio distribution procedure as PoC procedures but also a busy determining procedure.

The communication media server 2 always investigates whether data is received from any of the communication terminal 3 and the communication control server 1. If the communication media server 2 receives data from any of the communication terminal 3 and the communication control server 1 (S210), then the communication media server 2 judges whether the received data is a control message or audio data (S211). If the received data is a control message, then the communication media server 2 judges whether the control message is a request of starting busy determination (S212). If the control message is not a request of starting busy determination (S212: NO), then the communication media server 2 performs control procedures, such as a procedure for changing distribution destination data in response to a notice for the right to transmit (S213), followed by returning the process to S210.

On the other hand, if the control message is a request of starting busy determination (S121: YES), a busy determination flag of the busy management data is turned on to start the busy determination of the user x directed by the request of starting busy determination (S214). After that, the communication media server 2 returns the process to S210.

If the data received in S210 is audio data, then the communication media server 2 refer to the busy determination flag of the busy management data and then judges whether the busy determination flag of a data sender is turned on (S215). Here, the data sender can be identified from the participating user where the source address corresponds to the address field and the port numbers (audio and video) of the distribution destination data with reference to the distribution destination data shown in FIG. 6. Furthermore, if there is no inaccurate communication device 3, the user in the talking user field may be directly identified as a data sender.

If S215 determines that the busy determination is not started, or the flag is turned off (S215: NO), then the communication media server 2 performs an audio distribution procedure (S216) and returns the process to S210. Here, the term "audio distribution procedure" means that the received audio data is sent to the addresses and ports of all the participating users with reference to the distribution destination list of FIG. 6.

If S215 determines that the busy determination is being started, or the flag is turned on (S215: YES), then the communication media server 2 determines whether the received audio data is silent (S217). A silent state is determined by confirming that the waveform of the received audio data has amplitude not greater than a predetermined level.

If it is determined that the received audio data is of a voiced sound (S217: NO), then the communication media server 2 performs an audio distribution procedure in S216 while initializing the time of starting a silent state of the busy management data to an initial value (−1) (S218).

If it is determined that the received audio data is silent (S217: YES), then the communication media server 2 refers to the time of starting a silent state of the busy management data and then judges whether the time of starting a silent state is an initial value (−1) (S219). If it is the initial value (−1) (S219: YES), then the communication media server 2 changes the time of starting a silent state of the busy management data to a current time (time elapsed from system startup) (S220).

If the current time is changed in S220 or S219 determines that the time is different from the initial value (S219: NO), the communication media server 2 changes the time of final confirmation of the silence of the busy management data (e.g., the time elapsed from system startup) and then calculates a silent time (S221).

Subsequently, the communication media server 2 judges whether the time calculated in S221 is shorter than a predetermined time (e.g., 3000 msec) (S222). If the calculated silent time is shorter than a predetermined time (S222: YES), then the communication media server 2 performs an audio distribution procedure in S216.

Here, the communication control server 1 checks an elapsed time from starting the waiting in advance. If the elapsed time is longer than a predetermined threshold (e.g., one minute), then the operations subsequent to S203 may be performed as if any silence cannot be detected.

If the calculated silent time is equal to or longer than a predetermined time (S222: NO), then it is determined that a silence is detected and the busy judging unit 201 sends a notice of silence detection to the forced change management unit 104 of the communication control server 1 (S223). Subsequently, the communication media server 2 turns off the busy determination flag of the busy management data (S224) and initializes the time of starting a silent state of the busy management data to an initial value (−1) (S218). Then, the audio distribution procedure of S216 is performed.

In the communication system of the second embodiment, each of the communication control server 1 and the communication media server 2 participates in another session when talking is performed in an important (high-priority) session. In addition, if there is a communication terminal 3 which is currently talking, each of them can wait a break in the talking of the communication terminal 3. Besides, upon break of talking, another user who listens to the talking of the communication terminal 3 can be informed of a notice of withdrawal of the speaker. Therefore, confusion of conversation can be prevented and the communication terminal 3 which is currently talking can forcibly listen to the important talking.

(Third Embodiment)

In the communication system of the first embodiment, when talking is performed in a high-priority session, the communication terminal 3 which is talking in another session can be forcibly brought into the high-priority session immediately to listen to the talking in the high-priority session. In contrast, in the third embodiment, if talking is performed in a high-priority session, a timing of stopping the talking of the communication terminal 3 which is currently talking in another session (a break of the talking) is detected from a message of requesting a release of the right to talk and the session is then changed at this timing. The configuration of software is the same as one used in the second embodiment, so that the detailed description thereof will be omitted.

A communication media server 2 of a communication system according to the third embodiment includes a media distribution unit 200 that manages the distribution destination of media in response to an instruction from a session management unit 100 or the like of a communication control server 1 just as in the case with the first embodiment. The procedures performed in the media distribution unit 200 are the same as those performed in one of the first embodiment, so that the detailed description thereof will be omitted.

Figure 13:
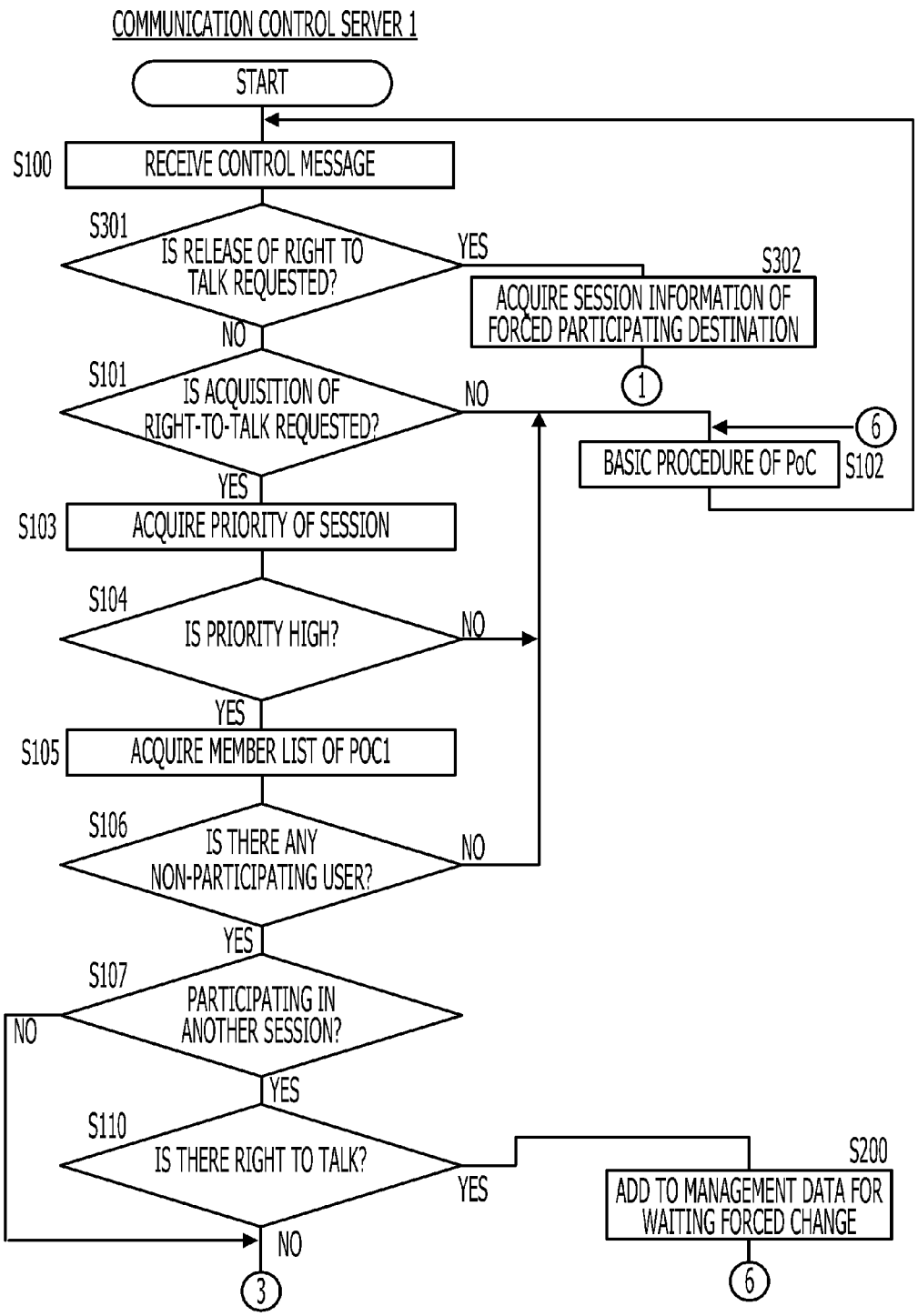
FIG. 13 illustrates a flowchart that represents a process carried out in the communication control server according to the third embodiment.

FIG. 13 is a flowchart of a process carried out by the communication control server 1 of the third embodiment. The procedures illustrated in FIG. 13 are different from those of the first embodiment in that the communication control server 1 does not forcibly change one session to another when receiving a request of the right to talk. In other words, FIG. 13 illustrates the procedures for waiting the end of talking when receiving a request of the right to talk and forcibly changing one session to another by receiving the request of the right to talk.

Here, the same procedures as those of the first embodiment will be represented by the same numbers as those in FIG. 7A and the detailed descriptions thereof will be omitted.

The communication control server 1 judges whether the user x (i.e., a user who belongs to PoC1 where the right to talk is requested and is currently participating in PoC2) acquires the right to talk in S110. If the user x acquires the right to talk (S110: YES), then the forced change management unit 104 adds the user x to the standby terminal field of the management data for waiting a forced change (S200). At this time, the forced change management unit 104 inputs the session information or the like of the current participating session of the forced participating destination. After that, the communication control sever 1 performs the basic procedure of PoC (S102) and then returns the process to S100.

On the other hand, if it is determined that the user x does not acquire the right to talk in S110 (S110: NO), then S108 and S109 shown in FIG. 7A are performed and the basic procedure of PoC is then performed (S102). Subsequently, the process is returned to S100.

In addition, the communication control server 1 judges whether the control message received in S100 is a request of releasing the right to talk (S301). If the received message is a request of releasing the right to talk (S301: YES), then the communication control server 1 acquires the session information or the like of the current participating session of the forced participating destination with reference to the management data for waiting a forced change (S302). Subsequently, the communication control server 1 performs the operations subsequent to S111 shown in FIG. 7B (i.e., the procedures for forcibly changing the participating session of the user x).

On the other hand, if it is determined that the received message is not a request of releasing the right to talk (S301: NO), then the communication control server 1 performs the operations subsequent to S101 of FIG. 7A in a manner similar to the first embodiment.

In the communication system of the third embodiment, each of the communication control server 1 and the communication media server 2 participates in another session when talking is performed in an important (high-priority) session. In addition, if there is a communication terminal 3 which is currently talking, each of them can wait an end of the talking of the communication terminal 3. Besides, upon end of talking, another user who listens to the talking of the communication terminal 3 can be informed of a notice of withdrawal of the speaker. Therefore, confusion of conversation can be prevented and the communication terminal 3 which is currently talking can forcibly listen to the important talking. Here, the second embodiment and the third embodiment may be used in combination with each other. For example, a break of the talking may be searched by silent detection in a manner similar to the second embodiment. If there is no break found while a request of releasing the right to talk is received, a procedure of forcibly changing a session may be performed at this time in a manner similar to the third embodiment.

(Fourth Embodiment)

If a communication terminal 3 requests the right to talk, a communication system according to a fourth embodiment stores the most recent contents of talking within several seconds in advance when there is a possibility of letting the communication terminal 3 forcibly participate in another high-priority session. The communication system of the fourth embodiment performs the same silent detection as that of the second embodiment when there is talking in a high-priority session. In this case, the most recent contents of talking, which has been previously stored, is referred and the silent detection of the contents of talking is performed to realize silent detection at a timing more quickly than the second embodiment.

Figure 14:
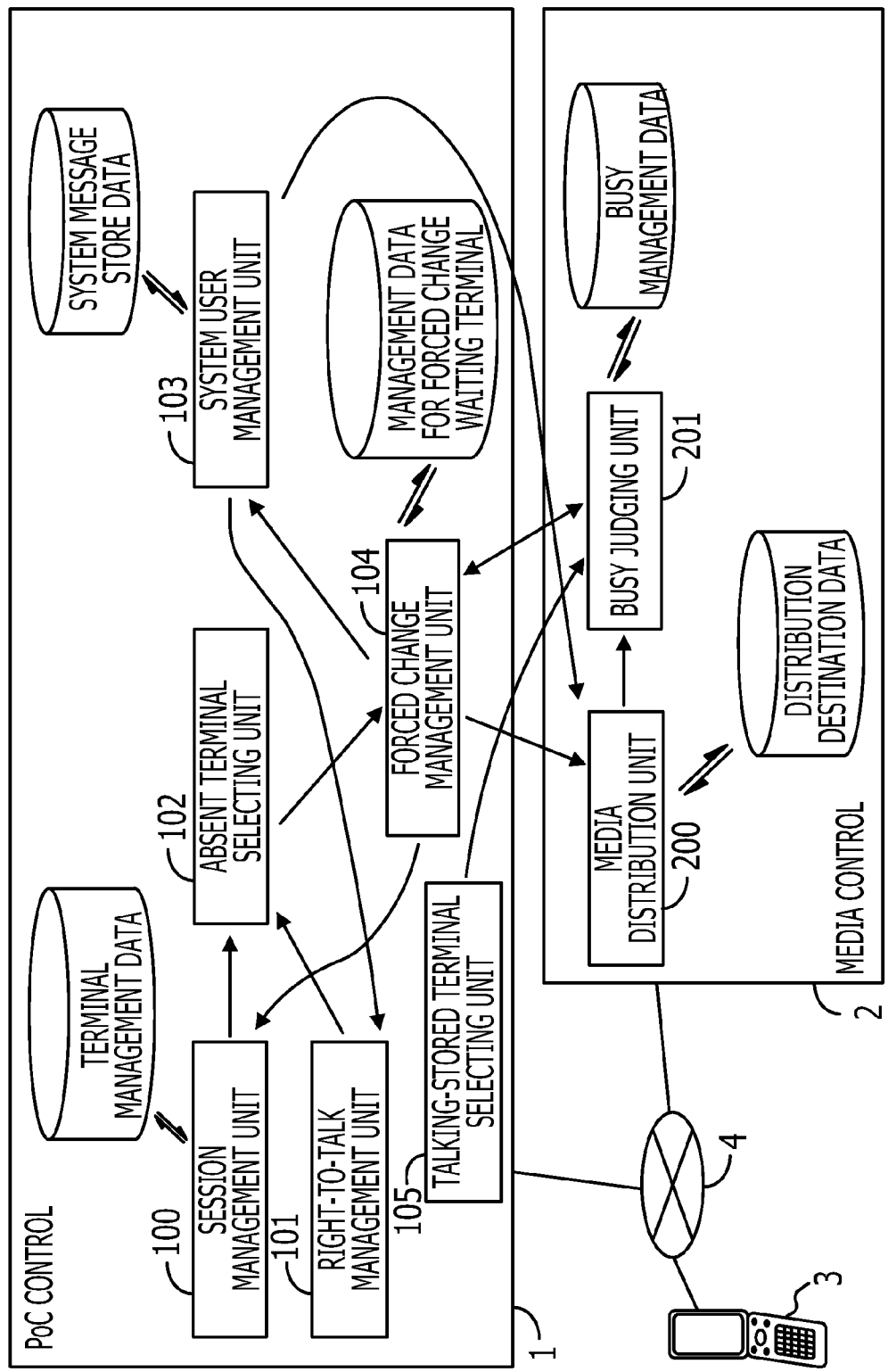
FIG. 14 illustrates a software configuration of a communication system according to a fourth embodiment.

FIG. 14 is a functional block diagram that illustrates an exemplary software configuration of the communication system according to the fourth embodiment. In a communication control server 1 of the communication system according to the fourth embodiment, like the one described in the second embodiment, a forced change management unit 104 manages a session change of a communication terminal 3 selected by an absent terminal selecting unit 102 and a system user management unit 103 transmits a system message. These procedures are the same as those performed by the communication control server 2 of the communication system according to the second embodiment, so that the detailed descriptions thereof will be omitted.

In addition to these components, the communication control server 1 of the fourth embodiment further includes a talking-stored terminal selecting unit 105. The talking-stored terminal selecting unit 105 selects a communication terminal 3 that may be forcibly brought into a high-priority session.

The procedures performed in the communication media server 2 of the communication system according to the fourth embodiment are the same as those performed in the communication media server 2 of the communication system according to the second embodiment, so that the detailed description thereof will be omitted. However, the busy management data of a busy judging unit 201 is further provided with a field for storing audio data in addition to the busy management data of the second embodiment.

FIG. 15 is an example of busy management data stored in the busy judging unit 201 of the communication media server 2 according to the fourth embodiment. In the example shown in FIG. 15, the contents of talking of the user 40 are currently being stored. In other words, 2400 bytes of the data is stored. For the user 41, the system has already terminated the procedure of storing data and is currently executing silent detection including the stored data. From the stored data, 500-msec silence is detected. In addition, from the contents of real-time communication, 200-msec silence is detected. Therefore, FIG. 15 shows that 700-msec silence in total is detected.

Figure 16A:
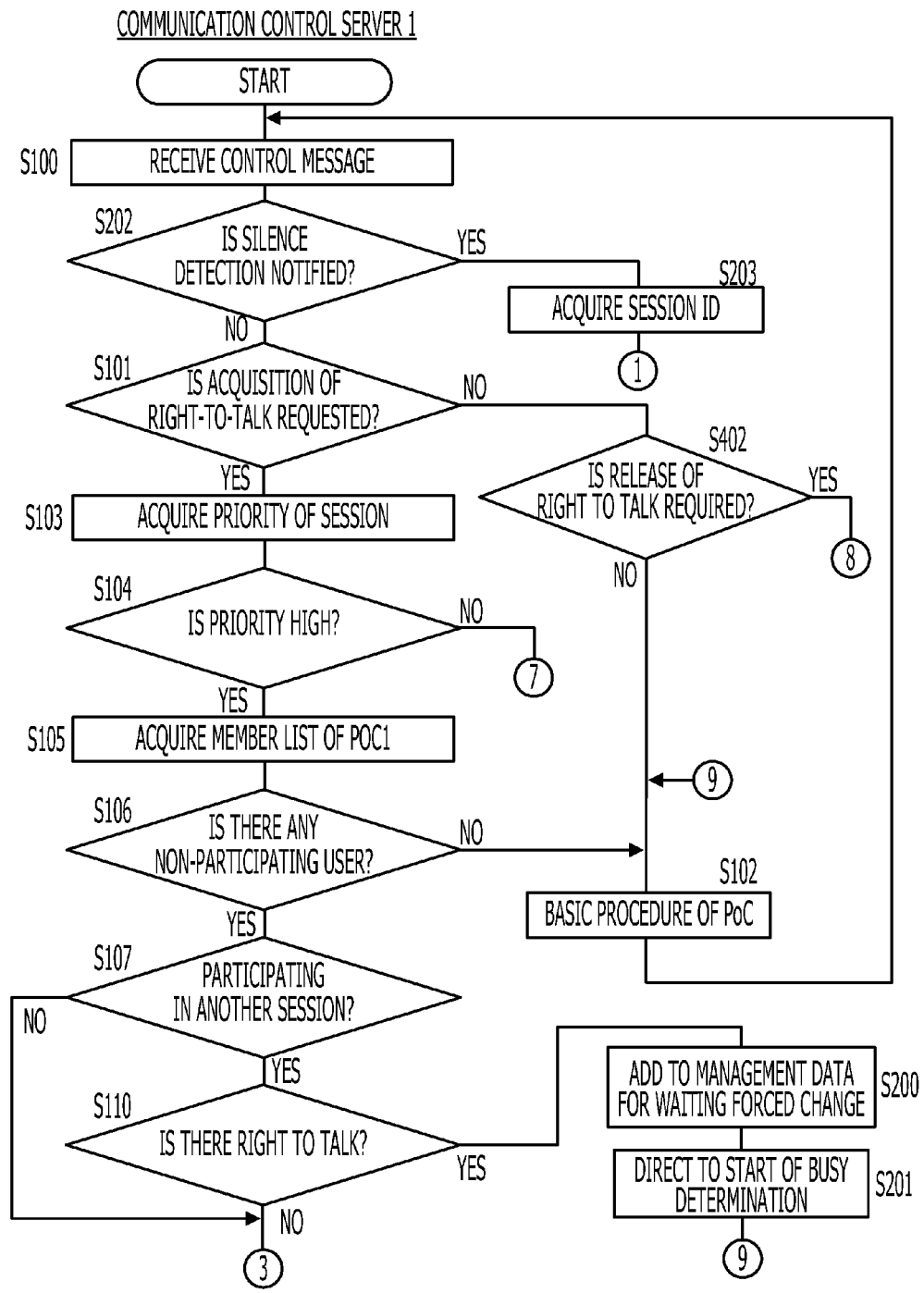
FIG. 16A and FIG. 16B illustrate a flowchart that represents a process carried out in a communication control server according to the fourth embodiment.
Figure 16B:
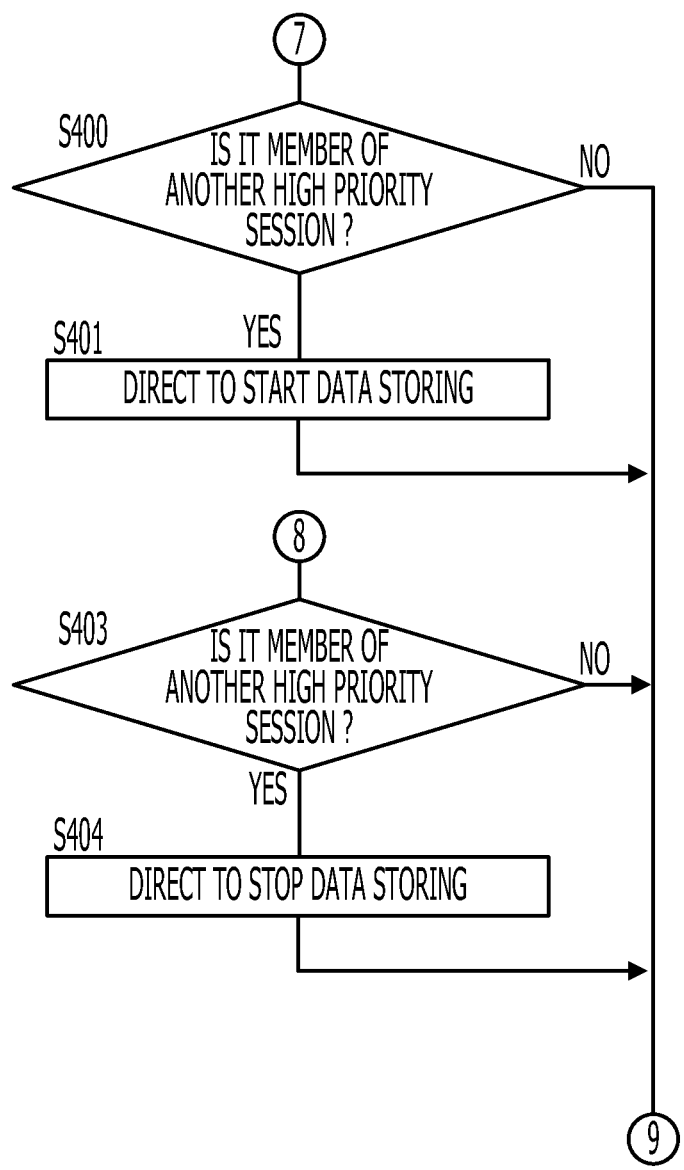

FIG. 16A and FIG. 16B illustrate a flowchart of a process carried out by the communication control server 1 according to the fourth embodiment. In FIG. 16A and FIG. 16B, in contrast to the second embodiment, the procedure of previously storing the contents of talking performed by the communication terminal 3 which may be forced to participate a high-priority session. Here, the same procedures as those of the second embodiment will be represented by the same numbers as those in FIG. 11 and the detailed descriptions thereof will be omitted.

In S103, the priority of session (PoC1) where the right to talk is requested is acquired. If the priority is low (S104: NO), then the talking-stored terminal selecting unit 105 of the communication control server 1 is determined whether a user requested the right to talk has become a member of another high-priority session among sessions other than PoC1 (whether it can participate in a high-priority session) (S400).

If it is determined that it is not a member of the high-priority session (S400: NO), then the communication control server 1 performs the basic procedure of PoC (S102), followed by returning the process to S100 in a manner similar to the first embodiment.

If S400 determines that it is a member of the high-priority session (S400: YES), the talking-stored terminal selecting unit 105 of the communication control server 1 directs the start of storing of the sent media data of the user who requests the right to talk to the busy judging unit 201 of the communication media server 2 (S401). Subsequently, the communication control server 1 carries out the basic procedure of PoC in S102, followed by returning the process to S100.

In addition, if the control message received in S100 is neither a notice of silence detection or a request of acquiring the right to talk (S202 and S101; NO), then the communication control server 1 judges whether the received control message is a request of releasing the right to talk (S402). If it is determined that the received control message is not a request of releasing the right to talk (S402: NO), then the communication control server 1 performs the basic procedure of PoC in S102 (S102) and returns the process to S100.

On the other hand, if it is determined that the received control message is a request of releasing the right to talk (S402: YES), then the talking-stored terminal selecting unit 105 judges whether the user who requests a release of the right to talk has become a member of another high-priority session among sessions other than PoC1 (whether it can participate in a high-priority session) (S403).

If it is determined that the above user is not a member of the high-priority session (S403: NO), then the communication control server 1 performs the basic procedure of PoC in S102 (S102) and returns the process to S100.

If 403 determines that the above user is a member of the high-priority session (S403: YES), then the talking-stored terminal selecting unit 105 directs the busy judging unit 201 to stop storing the sent media data of the user who requests a release of the right to talk (S404). Subsequently, the communication control server 1 performs the basic procedure of PoC in S102 (S102) and returns the process to S100.

Figure 17:
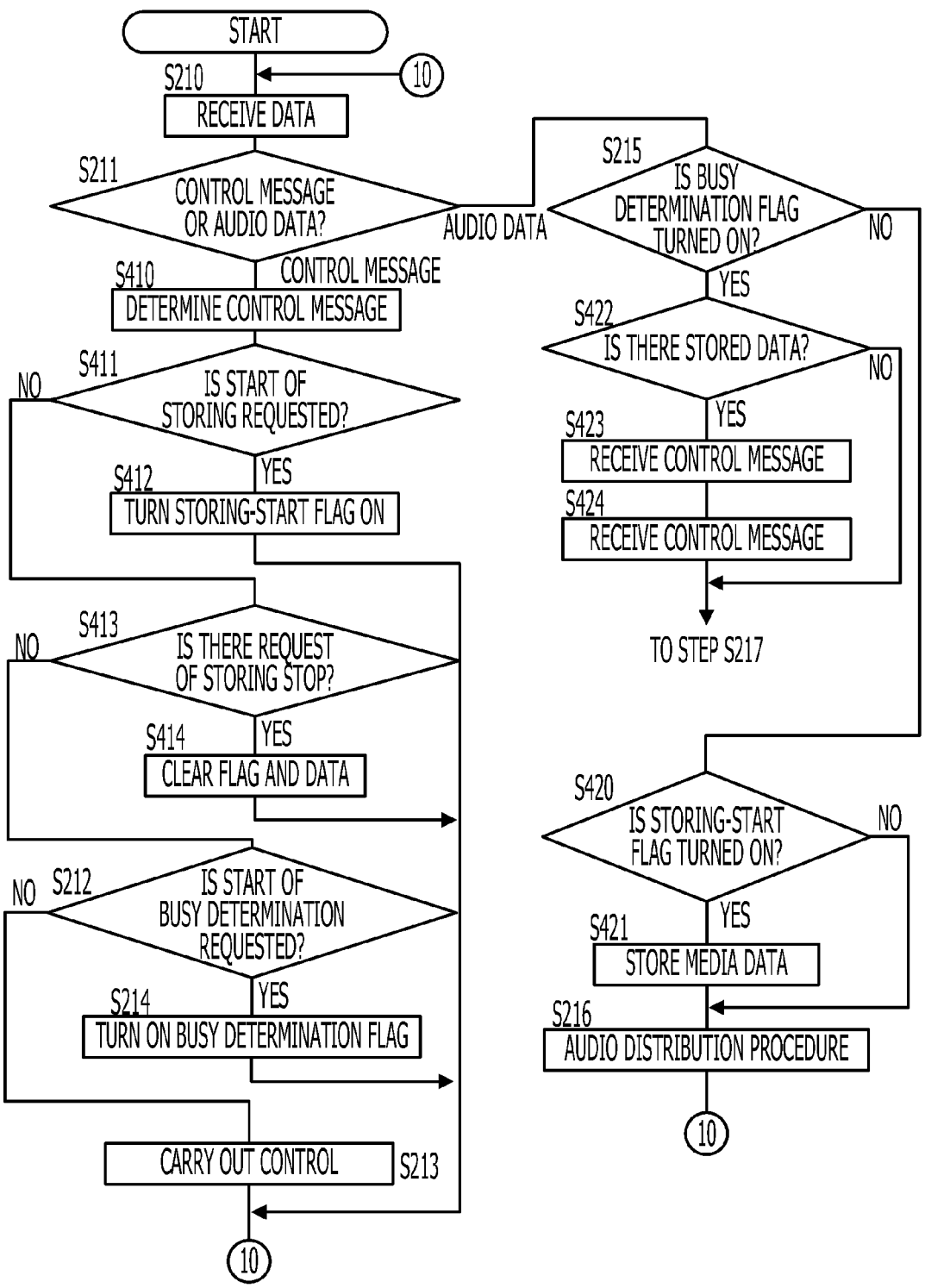
FIG. 17 illustrates a flowchart that represents a process carried out in the communication media server according to the fourth embodiment.

FIG. 17 is a flowchart of a process carried out by the communication media server 2 of the fourth embodiment. In the fourth embodiment, in addition to the procedures of the second embodiment, the procedures of storing media data and carrying out busy determination using the stored media data are also performed.

If the data received in S210 is a control message, then the communication media server 2 identifies the control message (S410) and judges whether the control message is a request of starting storing (S411). If the control message is a request of starting storing (S411: YES), then the busy judging unit 201 turns on a storing-start flag of the user who has been requested to start storing the busy management data (S412) and returns to the data-receiving procedure (S210).

If the control message is not a request of starting storing (S411: NO), then the busy judging unit 201 judges whether the control message is a request of stopping the storing of media (S413). If the control message is a request of stopping the storing of media (S413: YES), then the busy judging unit 201 turns off the storing-start flag of the user who has been requested to stop storing the busy management data to initialize the stored data (S414) and returns to the data-receiving procedure (S210).

If the control message is not a request of stopping the storing of media (S413: NO), then the communication media server 2 performs the operations subsequent to S212 shown in FIG. 12 in a manner similar to the first embodiment.

In addition, S215 confirms whether the busy determination flag of the data sender is turned on in a manner similar to the second embodiment. If the busy determination is not carried out (S215: NO), then the busy judging unit 201 judges whether the storing-start flag of the busy management data is turned on (S420). If the storing-start flag is turned off (S420: NO), then the communication media server 2 performs an audio distribution procedure in S216 and returns the process to the data-receiving procedure in S210.

If the storing-start flag is turned on (S420: YES), then the received media data is stored in the stored data field of the busy management data (S421). Subsequently, the communication media server 2 performs an audio distribution procedure in S216 and returns the process to the data-receiving procedure in S210. In S421, the storing of media data is performed for a predetermined time of the newest received media data.

For example, in a state of being set to store the newest two-second audio data, if 20-millisecond data is received while two-second data has been already stored, then the oldest 20-millisecond data is deleted and the received 20-millisecond data is stored. If the busy determination is started in S215 (S215: YES), then the busy judging unit 201 refers to the stored data field of the busy management data to determine whether the storage data is present (S422). If there is no stored data (S422: NO), then the operations subsequent to S217 shown in FIG. 12 are performed in a manner similar to the second embodiment.

If there is stored data (S422: YES), then the stored data field of the busy management data is referred and the stored data are sequentially referred in reverse chronological order to calculate a silence-starting time and a silent time (S423). The communication media server 2 inputs both the calculated silence-starting time and the silent time into the respective fields of the busy management data. Furthermore, the busy judging unit 201 turns off the storing-start flag of the busy management data to initialize the stored data (S424) and performs the operations subsequent to S217 shown in FIG. 12 in a manner similar to the second embodiment.

In the communication system of the fourth embodiment, if each of the communication control server 1 and the communication media server 2 participates in another session and includes a communication terminal 3 which is currently talking therein when there is talking in an important (high-priority) session, a silent time is detected with reference to the talking of the communication terminal 3 which has been previously stored. Thus, the silence detection can be performed in the early stage and the communication terminal 3 which is currently talking can be allowed to listen the important talking earlier, compared with the second embodiment.

(Fifth Embodiment)

In the communication system of the second embodiment, if talking is performed in a high-priority session, the monitoring of the contents of talking of the communication terminal 3, which is talking in another session, is started and the communication system enters the state of waiting a forced change in session. Furthermore, the timing of becoming silent in the contents of the talking is detected as a break of the talking and a change in session can be performed using such timing. In contrast, a communication system according to a fifth embodiment stores talking performed in a high-priority session when a change in session is being delayed by silence detection or the like and then transmits the stored talking after changing the session. The user of the communication terminal 3, which is forced to change in session, can listen to all voice in the high-priority session.

Figure 18:
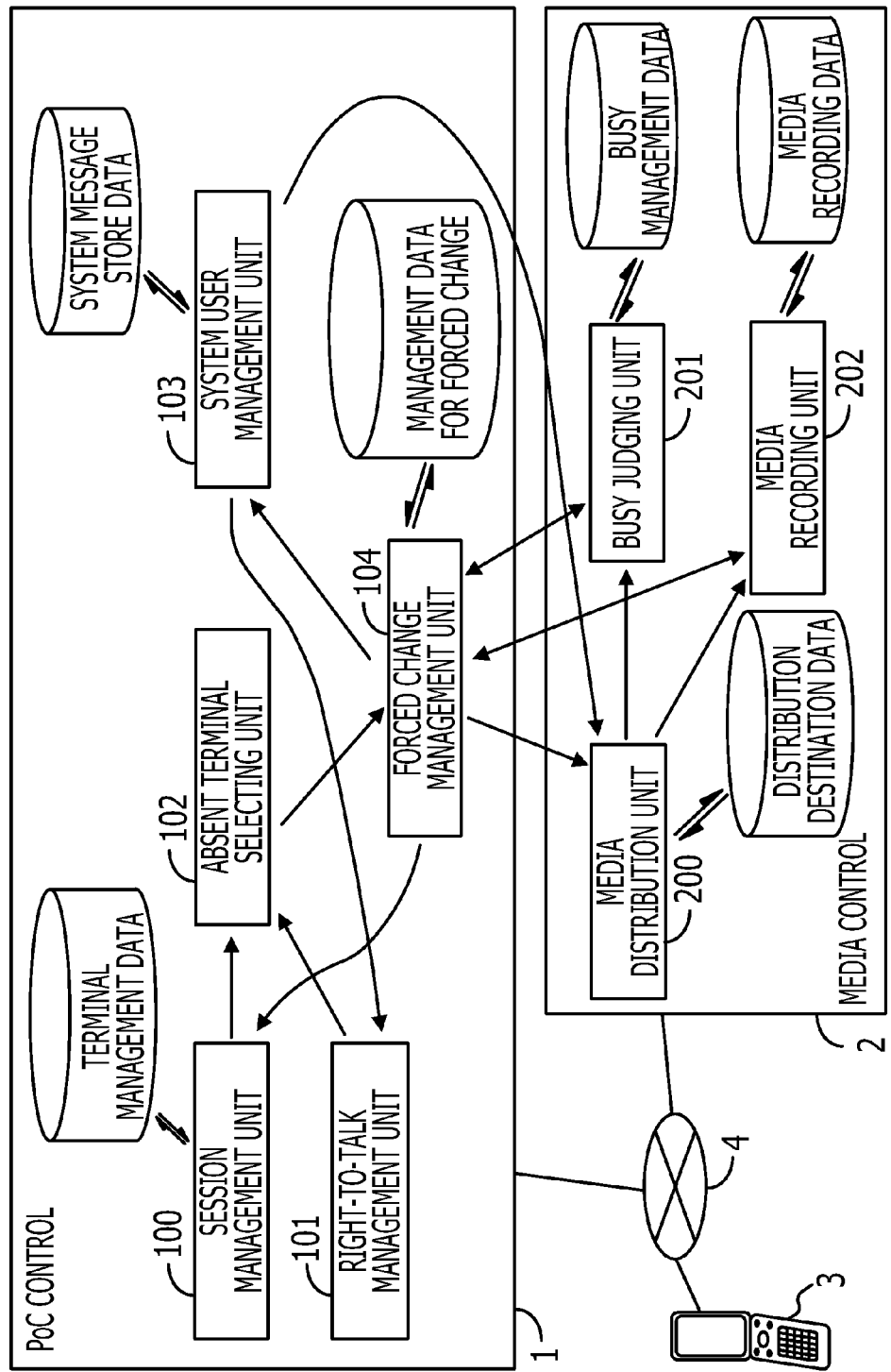
FIG. 18 illustrates a software configuration of a communication system according to a fifth embodiment.

FIG. 18 is a functional block diagram that illustrates an exemplary software configuration of a communication system according to a fifth embodiment.

The procedures performed in the communication control server 1 of the communication system according to the fifth embodiment are the same as those performed in the communication control server 1 of the communication system according to the second embodiment, so that the detailed description thereof will be omitted. The procedures performed in both the media distribution unit 200 and the busy judging unit 201 of the communication media server 2 of the communication system according to the fifth embodiment are the same as those performed in the communication media server 2 of the communication system according to the second embodiment, so that the detailed description thereof will be omitted.

The communication media server 2 in the communication system of the fifth embodiment further includes a media recording unit 202. In response to an instruction from a forced change management unit 104, a media recording unit 202 records conversations performed in a forced change destination session onto media-recording data and then transmits the recorded data to a communication terminal 3 which is forced to participate with a delay.

FIG. 19 is a diagram illustrating an example of media-recording data stored in the media-recording unit 202 of the communication media server 2 of the fifth embodiment. The example in FIG. 19 represents that the talking of PoC2 is stored for user 01, user 05, and user 10. There are three pieces of the stored media data and the third of them is being recorded now. Both the user 01 and the user 05 has already forcibly participated and already obtained the talking from the first user 02. FIG. 19 represents that the user 01 has already acquired the talking from the second user 06.

Figure 20A:
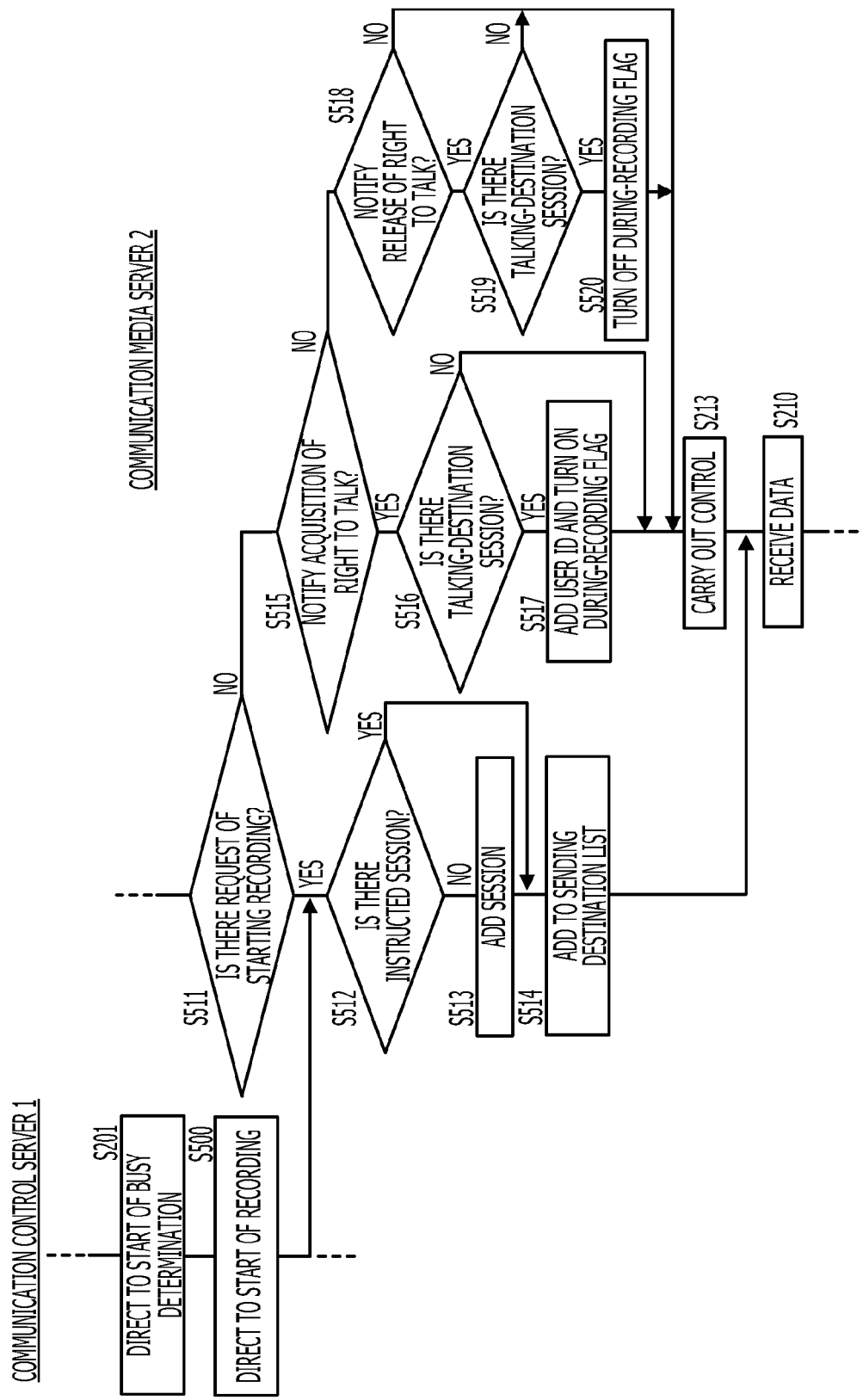
FIG. 20A, FIG. 20B, and FIG. 20C illustrate a flowchart that represents processes carried out in the communication control server and the communication media server according to the fifth embodiment.
Figure 20B:
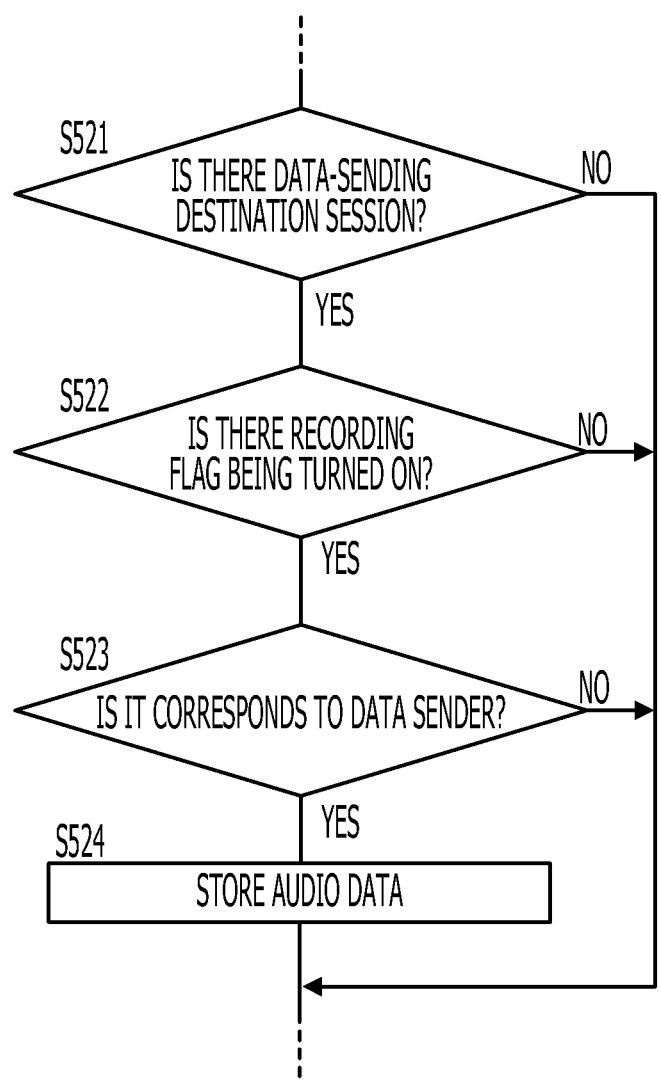
Figure 20C:
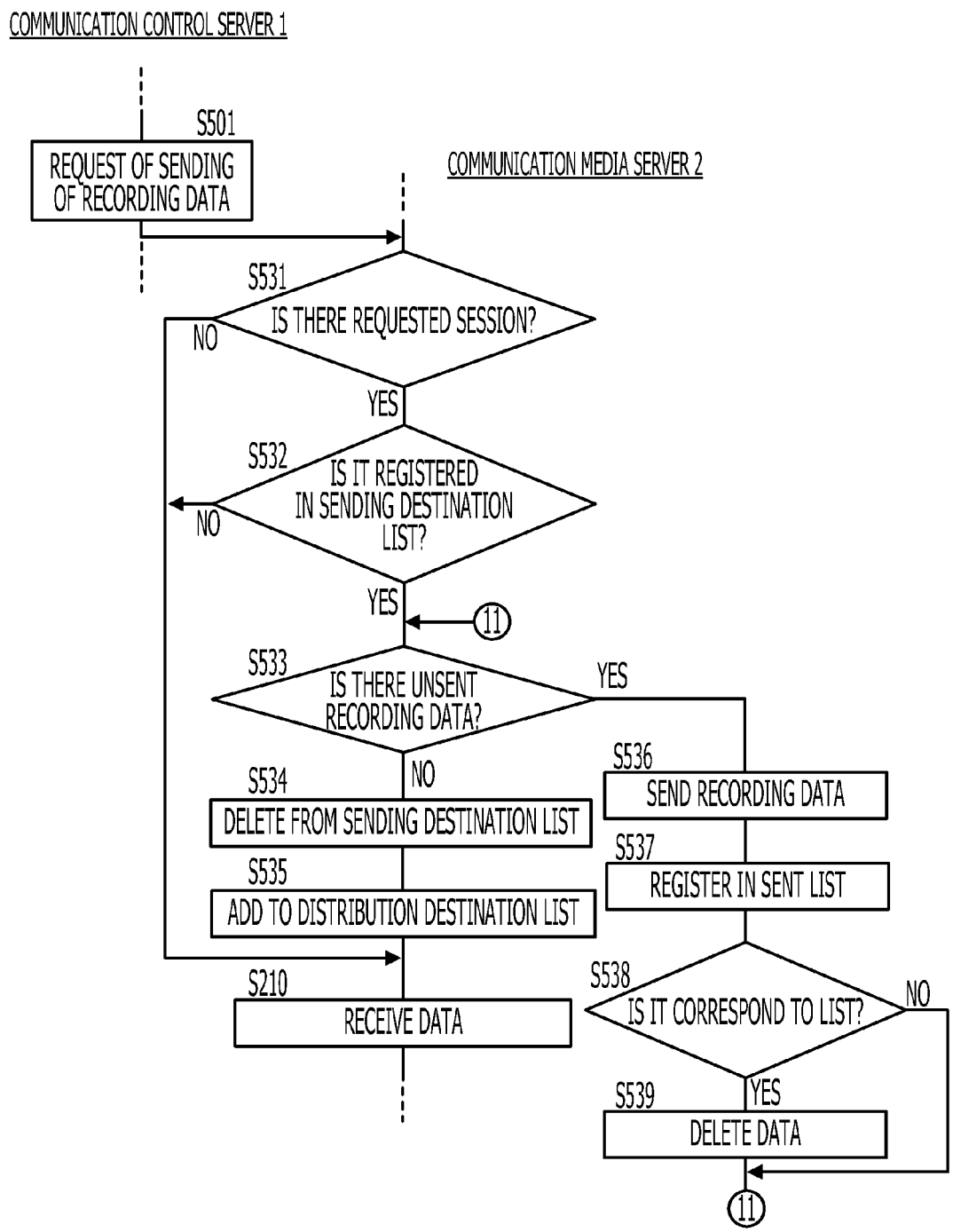

FIG. 20A to FIG. 20C illustrate a flowchart of a process performed by each of the communication control server 1 and the communication media server 2. As shown in FIG. 20A to FIG. 20C, the fifth embodiment includes, in addition to the procedures of the second embodiment, the procedure of previously storing the contents of talking performed in the high-priority session and the procedure of transmitting the stored talking to the communication terminal 3 which is forced to participate with a delay.

In other words, FIG. 20A to FIG. 20C mainly illustrate additional procedures in addition to the procedures of the second embodiment.

If the communication control server 1 directs the busy judging unit 201 of the communication media server 2 to start busy determination of the user x in a manner similar to the second embodiment (S201), then the forced change management unit 104 of the communication control server 1 directs the media recording unit 202 of the communication media server 2 to start recording of the talking contents of PoC1 which is a forced change destination session (S500).

Subsequently, the communication control server 1 performs the basic procedure of PoC in S102 (S102) and returns the process to S100.

If the communication media server 2 determines that the received data is a control message in a manner similar to the second embodiment (see S210 and S211 in FIG. 12), the communication media server 2 evaluates the control message to determine whether the control message is a request to start recording (S511).

When the control message is a request to start recording (S511: YES), then the media recording unit 202 judges whether the session ID field of the media recording data includes a session to which the recording start is directed (S512). If it is determined that there is no session (S512: NO), then the media recording unit 202 adds the session to which the recording start is directed to the session ID field of the media recording data (S513). If the session to which the recording start is direct is added (S513) or there is a session to which the recording start is directed in the session ID field of the media recording data (S512: YES), then the media recording unit 202 adds the user x to the sending destination list in the session ID field corresponding to the media recording data (S514).

Subsequently, the communication media server 2 returns the process to the data-receiving procedure (S210).

If the control message is not a request of start recording (S511: NO), then the communication media server 2 judges whether the determined control message is a notice of acquisition of the right to talk (S515).

If the control message is a notice of acquisition of the right to talk (S515: YES), then the media recording unit 202 judges whether the session ID field of the media recording data includes a talking-destination session acquired by the notice of acquisition of the right to talk (S516). If the session is present (S516: YES), then the media recording unit 202 adds in the media-recording data (FIG. 19) a new number to the talking number field of the media recording data and adds the user ID of a communication terminal 3 that has acquired the right to talk to the speaker (talking user) field of the additional row, followed by turning the during-recording flag on (S517).

If the during-recording flag is turned on (S517) or if there is no talking destination session acquired by the notice of acquisition of the right to talk in the session ID field of the media recording data (S516: NO), the communication media server 2 performs the control procedure in S213 and then returns the process to S210.

If the control message is not a notice of acquisition of the right to talk (S515: NO), the communication media server 2 judges whether the determined control message is a notice of release of the right to talk (S518).

If the control message is a notice of release of the right to talk (S518: YES), then the media recording unit 202 judges whether the talking-destination session, which has acquired the notice of release of the right to talk, is present in the session ID field of the media recording data (S519). If the session is present (S519: YES), the during-recording flag) of the user who has released the right to talk is turned off (S520).

If the during-recording flag is turned off (S520), the control message is not a notice of release of the right to talk (S518: NO), or the talking-destination session acquired by the notice of release of the right to talk in the session ID field of the media recording data (S519: NO),the communication media server 2 performs the control procedure in S213 in a manner similar to the second embodiment and then returns the process to S210.

In addition, if it is determined that the received data is audio data (see S210 and S211 in FIG. 12) in a manner similar to the second embodiment, then it is determined whether the data-sending destination session exists in the session ID field of the media recording data (S521). If it is determined that the session does not exist (S521: NO), then the procedures subsequent to S215 in FIG. 12, or the procedures after determination of whether the busy determination flag of the sender is turned on, are carried out.

If a data-sending destination session exists in the session ID field of the media recording data (S521: YES), then it is determined whether the during-recording flag of the session ID includes one turned on (S522). If it is determined that there is no during-recording flag being turned on (S522: NO), then the operations subsequent to S215 shown in FIG. 12 are performed in a manner similar to the second embodiment.

If there is a during-recording flag being turned on (S522: YES), then it is determined whether the speaker field of the on row is identical to the data sender (S523). If they are not identical to each other (S523: NO), then the operations subsequent to S215 shown in FIG. 12 are performed.

If the speaker field of the on row is identical to the data sender (S523: YES), the audio data received in the matched recording data field of the row is stored (S524) and the operations subsequent to S215 shown in FIG. 12 are performed.

Furthermore, if the forced change management unit 104 of the communication control server 1 transmits a forced participation notice to the user x in a manner similar to the second embodiment, then the communication control server 1 directs the media recording unit 202 of the communication media server 2 to send the recording data of the forced destination session to the user x (S501). Subsequently, the communication control server 1 performs the basic procedure of PoC in S102 (S102) and returns the process to S100.

On the other hand, if the communication media server 2 receives data, then the communication media server 2 judges whether the data is control message data or audio data (see the fourth embodiment). In addition, if the received data is control message data, then the determination of the control message is performed. If it is determined that the control message is a request to transmit recording data, then the media recording unit 202 of the communication media server 2 judges whether there is a session to which the transmission of recording data to the session ID field of the media recording data is present (S531). If the session to which the transmission of recording data is requested does not exist (S531: NO), then the process returns to the data-receiving procedure (S210).

If the session to which the transmission of recording data is requested exists (S531: YES), then the determination of whether a sending destination user (hereinafter, user x) specified by the request of transmission of recording data is registered in the sending destination list of the session ID row (S210). If it is not registered (S532: NO), then the process returns to the data-processing procedure (S210).

If the sending destination user is registered (S532: YES), pieces of the recording data are referred in order of the talking numbers thereof in the session ID row to determine whether there is a talking where the user x is not registered in the sent list. Thus, it is determined whether there is an unsent recording data (S533). If there is no talking where the user x is not registered in the sent list, or the transmission of all pieces of the recording data to the user x is completed (S533: NO), the user X is deleted from the media destination list field (S534).

Subsequently, the user x is added to the participating user field of the distribution destination data of the media distribution unit 200 so that the user can receive media data transmitted in real time (S535), and then the process returns to the data-receiving procedure (S210).

In the fifth embodiment, although the user x is added to the distribution destination data of the media distribution unit 200 with timing of S535, the user x is added to the distribution destination data of the media distribution unit 200 at the time of forcibly changing the user x in a manner similar to the PoC control process.

If it is determined that there is a talking where the user x is not registered in the sent list in S533, or there is recording data unsent to the user x (S533: YES), the unsent recording data is sent to the user x (S536). Then, if the data transmission is completed, the user is added to the sent list of the data row where the transmission of media recording data has been completed (Sep S537).

Furthermore, it is determined whether the sent list of the transmission-completed data row corresponds to the sending destination list (S538). If it is corresponded (S538: YES), then the data in the row where the data transmission of the media recording data is completed is deleted (S539). If the data is deleted (S539), or the sent list of the data row where the data transmission is completed does not correspond to the sending destination list (S538: NO), then the procedures after S533 are repeated.

Furthermore, the process carried out by the communication media server 2 after receiving the request to start recording (FIG. 20B) and the process carried out by the communication media server 2 after receiving the request to send the recording data (FIG. 20C) may be performed along with each other.

In the communication system of the fifth embodiment, each of the communication control server 1 and the communication media server 2 stores talking in a high-priority session when a change in session is being detected due to the silent detection or the like and the stored talking is then sent after the change in session to allow the user of the communication terminal 3, which is forcibly changed, to listen all of the voice in the high-priority session.

In each of the aforementioned embodiments, the communication control server 1 and the communication control server 2 are designed so that their functions are distributed to control communications. Alternatively, in each embodiment, the functions of the communication control server 1 and the functions of the communication media server 2 may be realized using a single server.

According to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the communication control server 1, the communication media server 2, communication terminal device 3, etc.) can comprise a controller (CPU) (e.g., a hardware logic circuitry based computer processor that processes or executes instructions, namely software/program), computer readable media, transmission communication interface (network interface), and/or an output device, for example, a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be output to an output device, for example, displayed on the display.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc—Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A server comprising:
   a memory storing instructions; and
   a processor coupled to the memory and which upon executing the instructions performs the following:
   provide sending permission for one terminal included in a communication group;
   send data received from the one terminal to another terminal included in same communication group;
   judge whether a withdrawn terminal is included in a first communication group, wherein the withdrawn terminal is a terminal which is provided with sending permission in a second communication group and without sending permission in the first communication group; and
   send, to one or more terminals other than the withdrawn terminal and included in the second communication group, a notice of withdrawal of the withdrawn terminal from the second communication group, when judged that the withdrawn terminal is included in the first communication group.

2. The server according to claim 1, wherein the processor is further configured to:
   receive data from the withdrawn terminal; and
   determine whether the data received includes silent data which lasts for a predetermined time, the notice of withdrawal sent when determined that the silent data is included in the received data.

3. The server according to claim 2, wherein priority data corresponding to the first communication group indicates a higher priority than a priority of the second communication group.

4. The server according to claim 3, wherein
   the priority data of each communication group indicates a degree of importance of each communication group, wherein
   the priority of each communication group is defined according to an instruction from a terminal included in each communication group and/or defined according to identification data (ID) of a terminal included in each communication group.

5. The server according to claim 1, wherein the processor is further configured to:
   determine whether a notice of ending of data-sending is received from the withdrawn terminal, wherein
   when determined that the notice of ending of data-sending is received from the withdrawn terminal, transmit the notice of withdrawal to the one or more terminals included in the second communication group.

6. The server according to claim 1, wherein the processor is further configured to:
   record data received from a first terminal to which the sending permission is provided in the first communication group; and
   transmit the data recorded to the withdrawn terminal which is withdrawn from the second communication group.

7. The server according to claim 1, wherein the processor is further configured to:
   generate a virtual terminal, which is included in the second communication group and provided with sending permission, wherein
   the notice of withdrawal is sent by the virtual terminal provided with the sending permission in the second communication group.

8. A non-transitory computer readable medium storing a program when executed by a computer performs the following:
   judging whether a withdrawn terminal is included in a first communication group, wherein the withdrawn terminal is a terminal which is provided with sending permission in a second communication group and without sending permission in the first communication group; and
   sending, to one or more terminals other than the withdrawn terminal and included in the second communication group, a notice of withdrawal of the withdrawn terminal from the second communication group, when judged that the withdrawn terminal is included in the first communication group.

9. A communication system comprising:
   a first server which includes
   a memory which stores information of each communication group containing a plurality of terminals,
   a processor coupled to the memory and configured to:
   judge whether a withdrawn terminal is included in a first communication group based upon reading the information stored in the memory, wherein the withdrawn terminal is a terminal which is provided with sending permission in a second communication group and without sending permission in the first communication group, and
   send, to one or more terminals other than the withdrawn terminal and included in the second communication grouped, a notice of withdrawal of the withdrawn terminal from the second communication group, when judged that the withdrawn terminal is included in the first communication group; and a second server which includes
- a processor configured to receive the notice of withdrawal from the first server, and
- send, to one or more terminals included in the second communication group, the notice of withdrawal of the withdrawn terminal from the second communication group, when the notice of withdrawal from the first server is received.

\* \* \* \* \*

UNITED STATES PATENT AND TRADEMARK OFFICE
CERTIFICATE OF CORRECTION

| | | |
|---|---|---|
| PATENT NO. | : 8,630,206 B2 | Page 1 of 1 |
| APPLICATION NO. | : 12/843432 | |
| DATED | : January 14, 2014 | |
| INVENTOR(S) | : Horio et al. | |

It is certified that error appears in the above-identified patent and that said Letters Patent is hereby corrected as shown below:

In the Claims

In Column 22, Line 67, In Claim 9, delete "grouped," and insert -- group, --, therefor.

Signed and Sealed this
Twenty-ninth Day of April, 2014

Michelle K. Lee
*Deputy Director of the United States Patent and Trademark Office*